(12) United States Patent
Ken

(10) Patent No.: US 10,604,203 B2
(45) Date of Patent: Mar. 31, 2020

(54) GREEN BIKE

(76) Inventor: Weng-Dah Ken, Hsinchu (TW)

( * ) Notice: Subject to any disclaimer, the term of this patent is extended or adjusted under 35 U.S.C. 154(b) by 369 days.

(21) Appl. No.: 13/253,543

(22) Filed: Oct. 5, 2011

(65) Prior Publication Data

US 2012/0086183 A1    Apr. 12, 2012

Related U.S. Application Data

(60) Provisional application No. 61/392,210, filed on Oct. 12, 2010.

(51) Int. Cl.
| *B62K 3/00* | (2006.01) |
| *B62J 6/12* | (2006.01) |
| *B60C 19/12* | (2006.01) |
| *B62M 17/00* | (2006.01) |

(52) U.S. Cl.
CPC ............... *B62J 6/12* (2013.01); *B60C 19/122* (2013.01); *B60C 19/127* (2013.01); *B62M 17/00* (2013.01); *B60C 2200/12* (2013.01); *Y02P 80/30* (2015.11)

(58) Field of Classification Search
CPC .................................................... B60C 19/122
USPC ................... 280/260, 281.1, 288.4, 259, 261
See application file for complete search history.

(56) References Cited

U.S. PATENT DOCUMENTS

| 738,566 A | 9/1903 | Nirdlinger |
| 3,854,516 A | 12/1974 | Burnell |
| 4,221,275 A * | 9/1980 | Pennebaker ............. B62M 6/45 |
| | | 180/206.3 |
| 4,613,010 A | 9/1986 | Enocson |
| 4,943,077 A * | 7/1990 | Lin et al. ...................... 280/260 |
| 5,080,737 A | 1/1992 | Shoner |
| 5,197,927 A | 3/1993 | Patterson et al. |
| 5,368,122 A | 11/1994 | Chou |
| 5,470,277 A * | 11/1995 | Romano ................ B62M 9/122 |
| | | 474/110 |
| 5,474,148 A * | 12/1995 | Takata ..................... B62M 6/45 |
| | | 180/206.2 |
| 5,482,306 A * | 1/1996 | Hsu ............................... 280/260 |
| 6,073,717 A * | 6/2000 | Yamamoto ............... B62M 6/55 |
| | | 180/206.4 |
| 6,131,683 A | 10/2000 | Wada |

(Continued)

FOREIGN PATENT DOCUMENTS

| CN | 86 1 02619 A | 1/1987 |
| CN | 201570964 U | 9/2010 |

(Continued)

OTHER PUBLICATIONS

European Search Report dated Feb. 9, 2012.
European Search Report dated Apr. 4, 2012.

*Primary Examiner* — Jacob D Knutson
(74) *Attorney, Agent, or Firm* — Winston Hsu

(57) ABSTRACT

A green bike comprises a frame, two wheels, a first internal-gear module and a second internal-gear module and a transmission element. The frame has a pedal, a front supporting unit, a rear supporting unit, and a seat unit. The two wheels are attached to the front supporting unit and the rear supporting unit, respectively. The transmission element is disposed in the frame or a tube shield linking to the frame. The first internal-gear module and the second internal-gear module are coupled with the pedal and at least one of the wheels. The transmission element links the first and the second internal-gear modules for delivering power to the at least one of the wheels.

14 Claims, 24 Drawing Sheets

(56) References Cited

U.S. PATENT DOCUMENTS

| | | | |
|---|---|---|---|
| 6,412,800 B1 | 7/2002 | Tommei | |
| 6,752,187 B1 | 6/2004 | Tien | |
| 7,243,937 B2 * | 7/2007 | Ishikawa | 280/288.4 |
| 7,604,079 B2 * | 10/2009 | Pittman | 180/205.5 |
| 2002/0121761 A1 * | 9/2002 | Chang | 280/260 |
| 2003/0047369 A1 * | 3/2003 | Katagiri | B60L 11/1801 180/206.2 |
| 2004/0119261 A1 * | 6/2004 | Troutman | B62M 17/00 280/259 |
| 2007/0068319 A1 * | 3/2007 | Kitamura | B62M 25/045 74/502.2 |
| 2007/0205574 A1 * | 9/2007 | Guderzo et al. | 280/261 |
| 2008/0252038 A1 * | 10/2008 | Blomme | B62J 99/00 280/281.1 |
| 2009/0200096 A1 * | 8/2009 | Pittman | B62M 6/25 180/205.5 |
| 2011/0049945 A1 * | 3/2011 | Mouri et al. | 297/195.1 |
| 2012/0049483 A1 * | 3/2012 | Dodman et al. | 280/281.1 |

FOREIGN PATENT DOCUMENTS

| | | | |
|---|---|---|---|
| CN | 201590739 U | 9/2010 | |
| DE | 38 22 417 | 1/1989 | |
| DE | 10359130 A1 * | 7/2005 | |
| EP | 1 375 197 | 1/2004 | |
| GB | 2 050 270 A | 1/1981 | |
| GB | 2461535 A * | 1/2010 | B62J 6/10 |
| KR | 100955892 B1 * | 5/2010 | |
| TW | 216092 | 11/1993 | |
| TW | 381997 | 2/2000 | |
| TW | 513504 | 12/2002 | |
| TW | I245003 | 12/2005 | |
| TW | 200708441 | 3/2007 | |

* cited by examiner

GREEN BIKE

CROSS REFERENCE TO RELATED APPLICATIONS

This application claims the benefit of U.S. Provisional Application No. 61/392,210 filed 2010 Oct. 12 and entitled "Green Bike Inventions". The entire contents of which are hereby incorporated by reference.

BACKGROUND OF THE INVENTION

Field of the Invention

The invention relates to a bike, and more particularly, to a green bike for carbon emission reduction and better environmental protection purposes.

Description of the Related Art

A bike is a pedal-driven, human-powered or mix-powered vehicle, having two wheels attached to a frame. Since its inception, the bike has undergone continuous adaptation and improvement. Also, with the advent of modern material and computer-aided design, bike innovations have continued. Many commuter or urban bicycles, such as US or European city bikes, are now equipped with 15- to 21-speed external-gear module built with sophisticated sprockets and derailleur which require higher cost and complicated process for routine maintenance. However, many drawbacks still exist in the manufacturing of bikes, when considering future green technology. Accordingly, given the global trend of that the greener is the better, following a detailed review of the conventional manufacturing processes for bikes, the new and innovative manufacturing ideas may be suggested.

U.S. Pat. No. 5,197,927 discloses a bicycle gear shifting system, including a chain connected to a rear multiple freewheel and a chain ring cluster, a front derailleur mechanism, and a rear derailleur mechanism. Once the front derailleur mechanism or the rear derailleur mechanism is actuated separately, the chain is shifted between different sprockets of the chain ring cluster or of the rear multiple freewheel.

In such a conventional gear shifting system, neither the chain nor the derailleur mechanisms can be protected by the frame of bike, which increases possibility of malfunction or mechanical corrosion in nominal weathers. Moreover, due to complications with the mounting process and routine maintenance difficulties, conventional bikes are normally discarded when the derailleur mechanism is broken or the chain is rusty or eroded. Thus, it increases global waste or carbon emission which is eventually against the purpose of environmental protection.

For tires of conventional bikes, there has been a persistent desire, but previously unfulfilled needs in the art, for finding an improved tire structures. Many tires, such as standard type tires, include a hollow ring-shape rubber tube disposed around a metal or plastic inner rim. The hollow tube is typically filled with air or inert gas to provide elasticity and comfort while people driving a bike. The air-filled tires are vulnerable to punctures or leaks depending on the roadway conditions, which allow air to escape from the rubber tube, rendering the tire unsuitable for use. Moreover, if the tire is punctured, the flat tire may hurt the bike driver or endanger the safety a lot of the bike driver.

U.S. Pat. No. 6,752,187 discloses another known tire in the art, wherein a tubeless tire includes a base having a proximal surface engageable with a spoke member and an opposing distal surface engageable with a surface of a tire bead of a tubeless tire, and an integral side wall extending from an intersection of the proximal surface and the distal surface. Despite the fact that its structural feature solves the problems of standard tires, it is not easy to fix this tire if the structure of the tubeless tire is deformed. Moreover, it is quite expensive for manufacturing that type of tubeless tires.

Thus, it is a dilemma to choose either conventional tire or a tubeless tire; especially when considering future green trends of bike industry. According to a statistics, about 10 million tons of natural rubber and 12 million tons of synthetic rubber are produced each year, wherein more than half are for tire manufacturing, and more and more are being made into other products. Hence, it has become an urgent issue to invent a new and environmentally friendly tire manufacturing method or structure to produce a more endurable and sustainable tire, which may overcome the current drawbacks.

Recently, on the other hand, more and more research has focused on electric power bikes due to their characteristics such as having low pollution or carbon emissions. However, since electric power is still required to run conventional electric power bikes, a heavy and pluggable rechargeable motor is mounted thereon.

U.S. Pat. No. 5,368,122 disclosed a DC motor with bevel pinions having a driving mechanism and a transmission collar which is installed on a rear triangular support mechanism. The transmission collar is rotated by the DC motor and the bevel pinions. Also, in U.S. Pat. No. 6,412,800, a kit is disclosed, wherein the kit includes an electric motor, a control, and gears, and is mounted below a pedal axle of a bicycle to power a bicycle. U.S. Pat. No. 6,131,683 discloses an electric bicycle comprising a DC flat type motor utilizing an axial magnetic flux, which rotates a wheel by means of a control circuit, a pedal load sensor, a pedal rotation speed sensor, a torque sensor, a speed reduction mechanism, a transmission device and gears.

In the described patents, an electric motor must be mounted on a frame of a bicycle and be coupled to a wheel thereof via gears or a transmission mechanism, which results in high costs and increased weights. Alternatively, the electric motor may be mounted in the hub of the bike. However, spokes of the bicycle must be re-fixed to the hub one by one for remounting, which requires a lot of time for assembly. Thus, the aforementioned motors are heavy, have short operating times, and are not convenient enough for commuter, urban or outdoor use purposes.

Therefore, a need exists for a green bike that overcomes the structural issues inherent with the conventional transmission systems found in the related art. Further, a need exists for a green bike that overcomes the complicated issues inherent with the electric motors found in the art. The subject matter of the present disclosure is directed to overcoming, or at least reducing the effects of one or more of the problems set forth above.

BRIEF SUMMARY OF THE INVENTION

The concept underlying the present invention is geared toward protecting the environment and making our life better and greener than ever before. By utilizing the so-called 4R principle of reduce, reuse, recycle and regeneration, a human-powered or mix-powered green bike is provided. The mix-powered green bike can be powered at least by human or electric power sources such as a typical rechargeable battery, solar cells, fuel cells and the like.

The novel multiple internal-gear modules, i.e. hub-gear or planetary gear or epicycle gear module, are about the gear ratio changing systems that can be used on bikes to fulfill future green technology product requirements. Internal-gear module can have better user experiences with longer and maintenance-free life cycle which are suitable for most of commuter use, city-use or hilly roadway conditions. External-gear modules, i.e. sprocket and derailleur, its gears and mechanical parts are exposed to the ambient. Oppositely, the internal-gear modules and its lubricants are sealed within a hub shell or a bracket shell associated with at least one of the bike driving wheels or pedals. Moreover, by integrating the gear changing control kits together, the changing of the gear ratio of multiple internal-gear modules is able to be accomplished with a single action which is associated to a single lever or a single twist-grip shifter/switch connecting to the multiple internal-gear modules.

In an exemplary embodiment, a green bike includes a frame, two wheels, a first internal-gear module and a second internal-gear module and a transmission element. The frame has a pedal, a front supporting unit, e.g. a front supporting unit with single arm or dual arms, a rear supporting unit, e.g. a rear supporting unit with single arm or dual arms, and a seat unit, including a seating pad or a saddle. The two wheels are attached to the front supporting unit and the rear supporting unit, respectively. The transmission element is disposed in the frame or linked to the frame with a tube shield in which the major portion of the transmission element is disposed. The first internal-gear module and the second internal-gear module are coupled with the pedals and the at least one of the wheels. The transmission element links the first and the second internal-gear modules for delivering power to the at least one of the wheels.

The transmission element is a transmission power coupling unit, associated with the multiple internal-gear modules, and is comprised of at least one of a chain, a belt, a shaft, a flexible rod or a flexible cord. The majority portions of the first internal-gear module, the second internal-gear module, the transmission element and an optional motor are concealed substantially in the frame or tube shield thereof. Thus, the entire power transmission system is protected from possible outer damage or corrosion, and a durable green bike is achieved. When riding the bike, a force or mechanical power applied by a user or the optional drive motor is transmitted to the at least one of the wheels (i.e. driving wheel). Up to nine gear ratios are provided to the rider, if three-speed gear ratios are provided by each of the first and the second gear modules. Thus, a user can enjoy riding the green bike with minimal force along the bike way with a smooth effort.

In another exemplary embodiment, a wheel of the green bike, respectively, includes a plurality of spokes, a hub, a rim, a tire, and a plurality of fillers. The rim is connected to the outer ends of the spokes, the hub is connected to the inner ends of the spokes, and the tire is fitted around the rim to be held by the rim. The plurality of fillers, inflated the tire being held by the rim, wherein the plurality of fillers is comprised of porous material or gaseous material, such as air, nitrogen gas, argon gas and the like. The tire of the wheel of the present invention is thus filled with plurality of fillers including at least one or more porous materials, which replaces the conventional air-inflated inner tube. Thus, compared with the conventional tires, a utility of the tire of the present invention is extended to all kinds of roadway conditions with safer riding experience and flat tires are to be prevented.

Yet in another exemplary embodiment, a power generator for green bike generating electric power includes a disc rotor, a plurality of magnetic poles, and a stator. The disc rotor is connected to the hub of a wheel and the disc rotor having a ring area. The plurality of magnetic poles is disposed in the disc rotor over the ring area with alternating south and north poles. The ratio of a length and width of the plurality of magnetic poles is larger than ×2:1 for achieving the better magneto-electric power generating efficiency. The stator is disposed in a shield cover or a dirt capping bracket, and comprises at least one first pole finger and a coil. Hereby, the pole finger is aligned with the ring area of the disc rotor and the coil surrounds the pole finger for generating the electric power for the green bike. The outer surface of the first pole fingers is not squared in shape for higher electric power generating efficiency when activating the power generator. By incorporating the 4R principle of reduce, reuse, recycle and regeneration, the disc rotor is further associated with a disc-brake module, wherein the disc-brake module shared the use of the disc rotor with the power generator. The power generator can be generating electric power associated with recycling of the kinetic energy of the bike or the rider, as an exemplary case, so as to light up a back-light LED for alerting purpose, while activating the disc-brake module with a brake control module. Thus, simultaneously, a moving speed of the green bike is hindered while the back-light LED is lit up for creating the safer riding experience that can achieve an objective of this invention for energy recycle or power regeneration without carbon emission.

Still yet in another exemplary embodiment of this invention, a green bike includes a frame, having a pedal, a front supporting unit, a rear supporting unit, and a seat unit. A driving wheel is attached to at least one of the front supporting unit or the rear supporting unit. A gear module is linked the pedal to the driving wheel for changing the gear ratio. A first transmission element is coupled to the pedal, the gear module and the driving wheel. A second transmission element is coupled the mechanical power transmission in between the gear module and a first load device other than the driving wheel. The first load device is either a built-in or external device having a power generating function, such as a head light, a rear-light, a flash light or a radio embedded with power generating function, or it can be a drive motor with electric power generating function and vice versa. The first load device is further coupled with wired or wirelessly connections to a second load device, wherein the second load device is a head light, a rear/back light, a flash light, a radio or the combination thereof. Also, the second load device can be a mobile electronics characterized with GPS, PDA, or cellular phone functions, or the combination thereof. Thus, it is able to achieve the better carbon emission (i.e. green-house gas) reduction by the energy recycling which is one of the objectives or utilities of this invention.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The various embodiments of this invention can simplify the sophisticated bike design, reducing manufacturing cost and space consumption of those freewheels, front derailleur, chain, sprocket, back derailleur. In addition, it may facilitate rider with required safer operational mechanism with the most comfort and better riding experiences. To achieve the objective of the invention and design an environmentally friendly, i.e. Eco friendly or Earth friendly, green bike which utilizes the "4R" core principles, a few more disclosures are presented. First, a transmission system of a green bike is provided, which reduces elements or parts exposure thereof to the outside ambient or erosive environment, and conforms to a more sustainable green bike. Next, in order to reduce waste materials produced from rubber manufacturing or rubber parts, a safer and more endurable wheel of a green bike is provided. Lastly, two power generators, utilizing different and greener design principles to produce electric power for the green bike, are described in detail.

Figure 1:
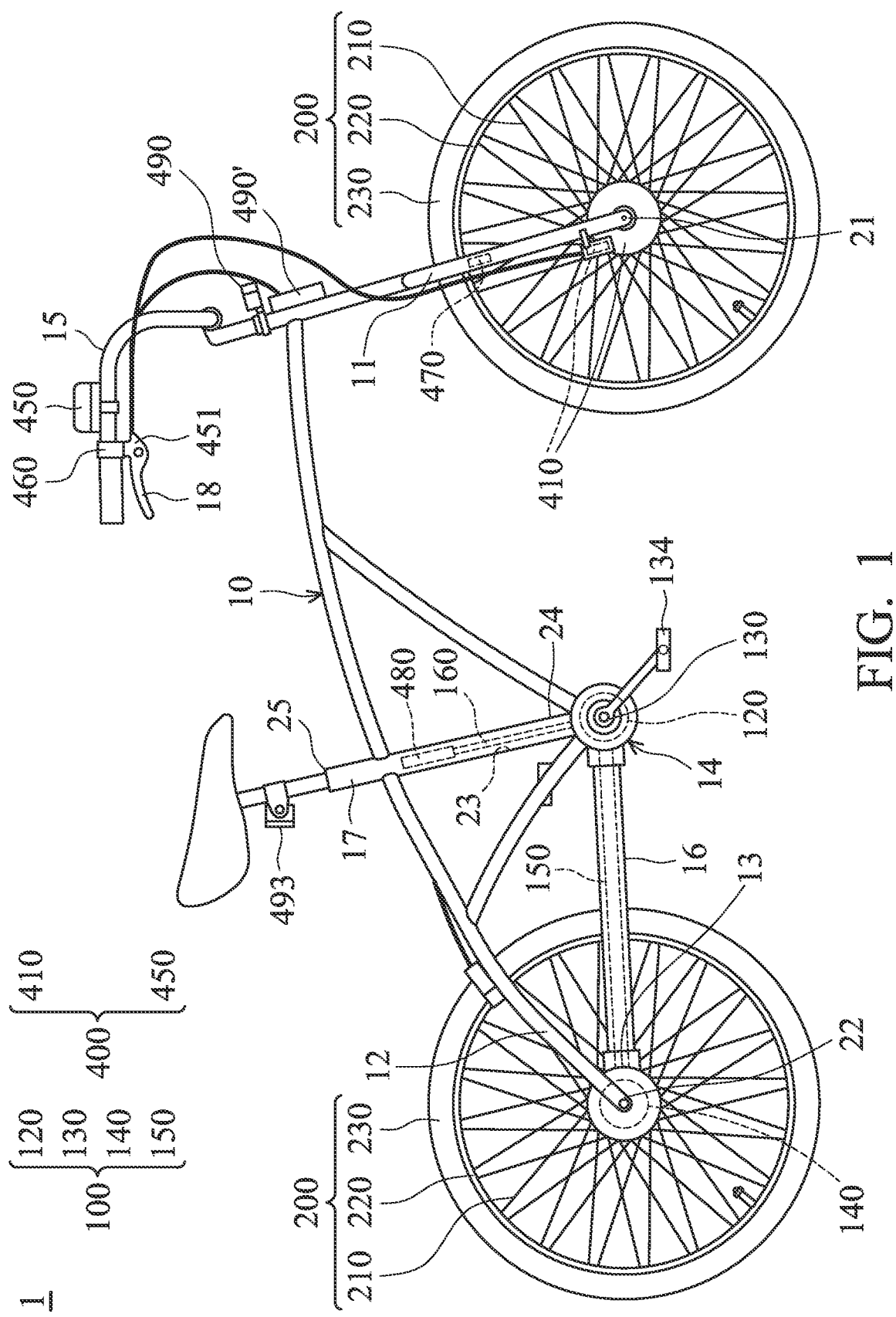
FIG. 1 is a schematic view of one of the green bike embodiments according to the present invention.
Figure 2:
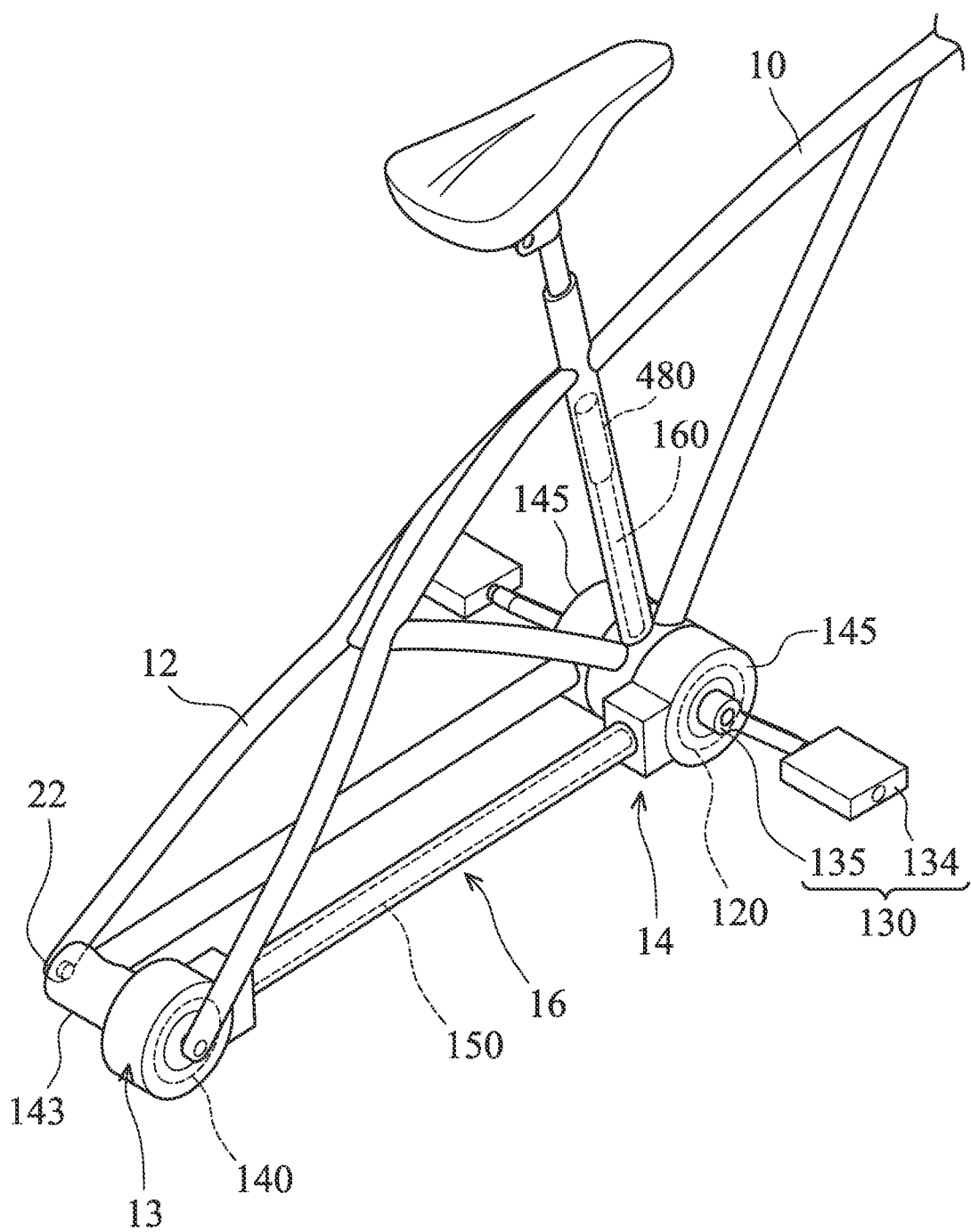
FIG. 2 is a partial perspective view of the green bike in FIG. 1.

Please refer to FIGS. 1 and 2. FIG. 1 illustrates an embodiment of a green bike 1. The green bike 1 includes a frame 10, a power transmission system 100, two wheels 200, a power generating module 400, and a single gear-ratio control module 460.

The frame 10 includes a front supporting unit 11, a rear supporting unit 12, a hub shell 143, a bottom bracket shell 14, a handle bar 15, a tube shield 16, a seat unit 17, and a brake control module 18. The front supporting unit 11, with single arm or dual arms, has one or two ends 21, and the rear supporting unit 12, with single arm or dual arms, has one or two ends 22. In this exemplary embodiment, both of the front and rear supporting unit, 11 and 12 respectively, have two arms including two ends. The two ends 22 of the rear supporting unit 12 are engaged with the hub shell 143 by one or more screws. The two ends 21 are connected to one of the wheels 200, and the two ends 22 are connected to another wheel 200 (i.e. driving wheel). As shown in FIG. 2, the bottom bracket shell 14 and the hub shell 143 are having substantially a cylindrical-like inner space therein, respectively, and the bottom bracket shell 14 has two side walls 145.

Figure 3:
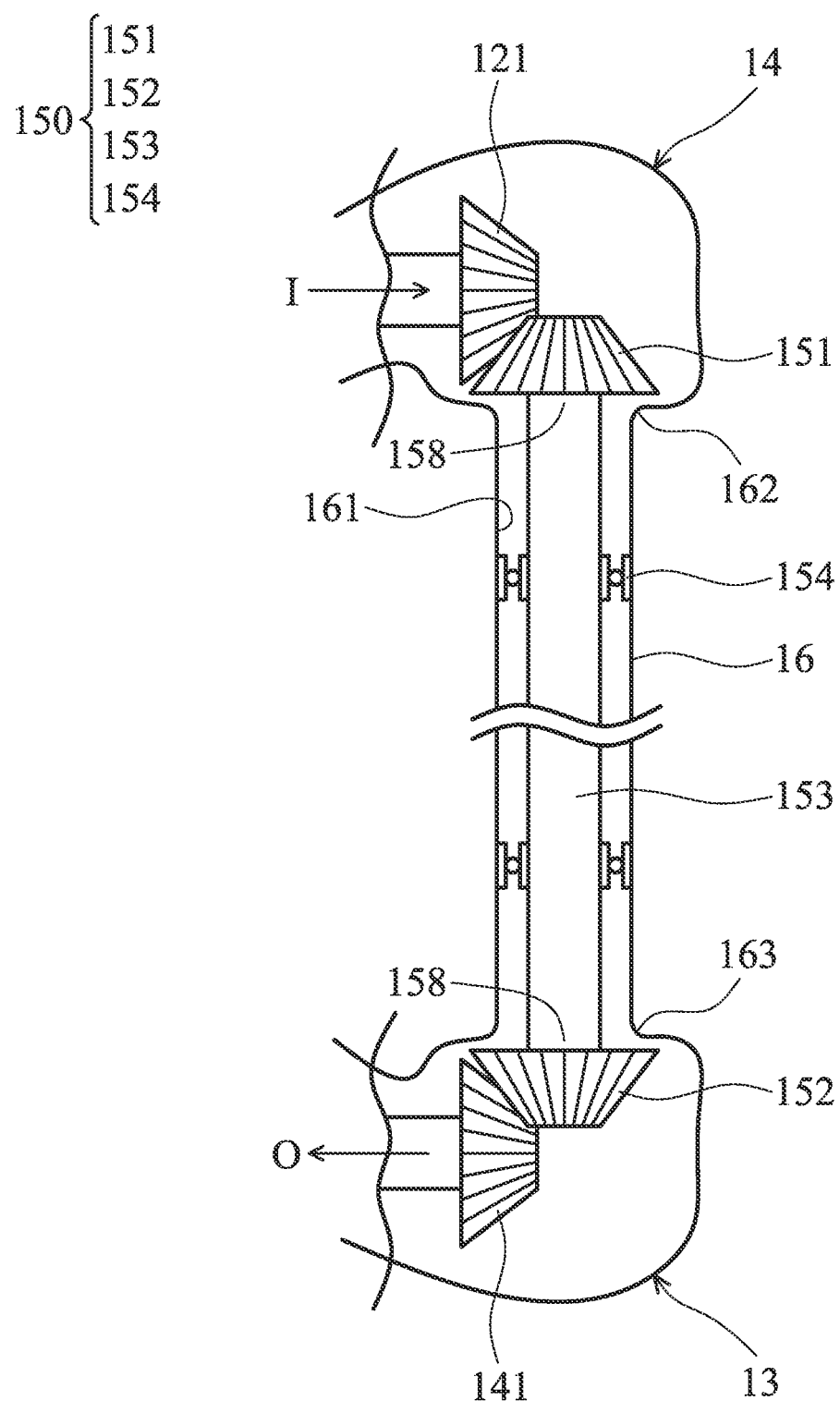
FIG. 3 is a partial schematic view of the green bike in FIG. 1, wherein the transmission element is comprised of a joint-less shaft, bevel gear and bearing. A major portion of the transmission element is disposed in a tube shield (16) and the tube shield is part of the frame.
Figure 5:
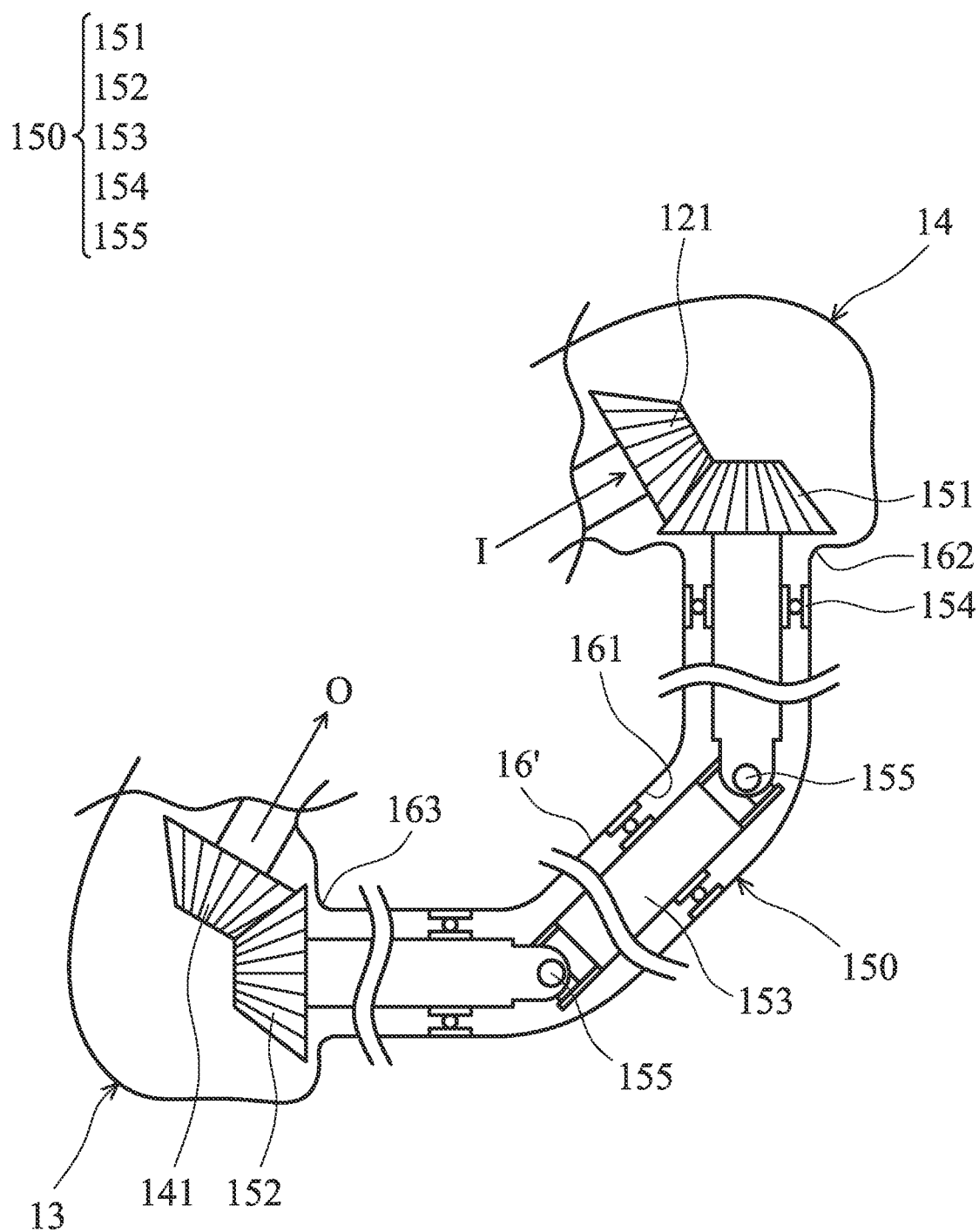
FIG. 5 is a partial schematic view of a varied embodiment of the green bike in FIG. 1, wherein the transmission element comprises a shaft having two joints and the tube shield (16') is with curved structure.

As shown in FIG. 3, the tube shield 16 is part of the frame 10 or is a unit linking to the frame 10. The tube shield 16 has an inner side 161 and two ends 162 and 163, wherein one end 162 is connected to the bottom bracket shell 14, and the other end 163 is connected to the hub shell 143. The tube shield 16, in this exemplary embodiment, is a one piece element; however it can be comprised of multiple pieces and it should not be limited thereto. As shown in FIG. 5 for another embodiment of the tube shield 16', the tube shield 16' has a curved configuration and includes multi-piece elements. As shown in FIG. 1, the seat unit 17 has an inner wall 23, and the lower end 24 of the seat unit 17 is connected via the frame 10 to the bottom bracket shell 14. Thus, a continuous passage formed from the upper end 25 of the seat unit 17 to the hub shell 143, because of that the hub shell 143, the bottom bracket shell 14, the tube shield 16, and the seat unit 17 are all hollow structures.

Figure 4A:
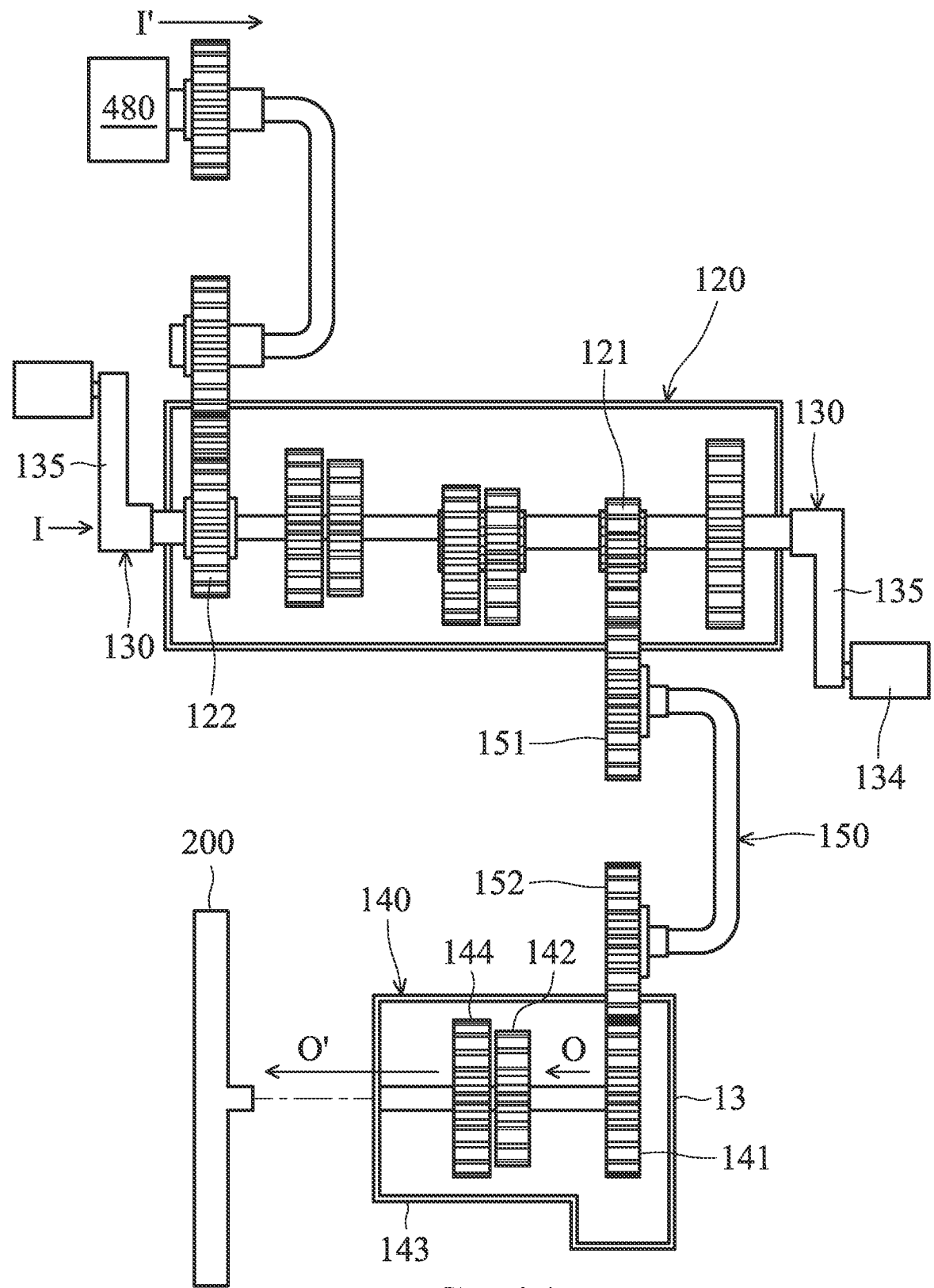
FIG. 4A is a schematic view of the transmission system of the green bike with first and second internal-gear modules in FIG. 1.

Please refer to FIGS. 2, 3 and 4A, the power transmission system 100 includes a first internal-gear module 120, a crank set 130, a second internal-gear module 140 and a first transmission element 150. Also, it can be further comprising a second transmission element 160, and a first load device 480.

Figure 4B:
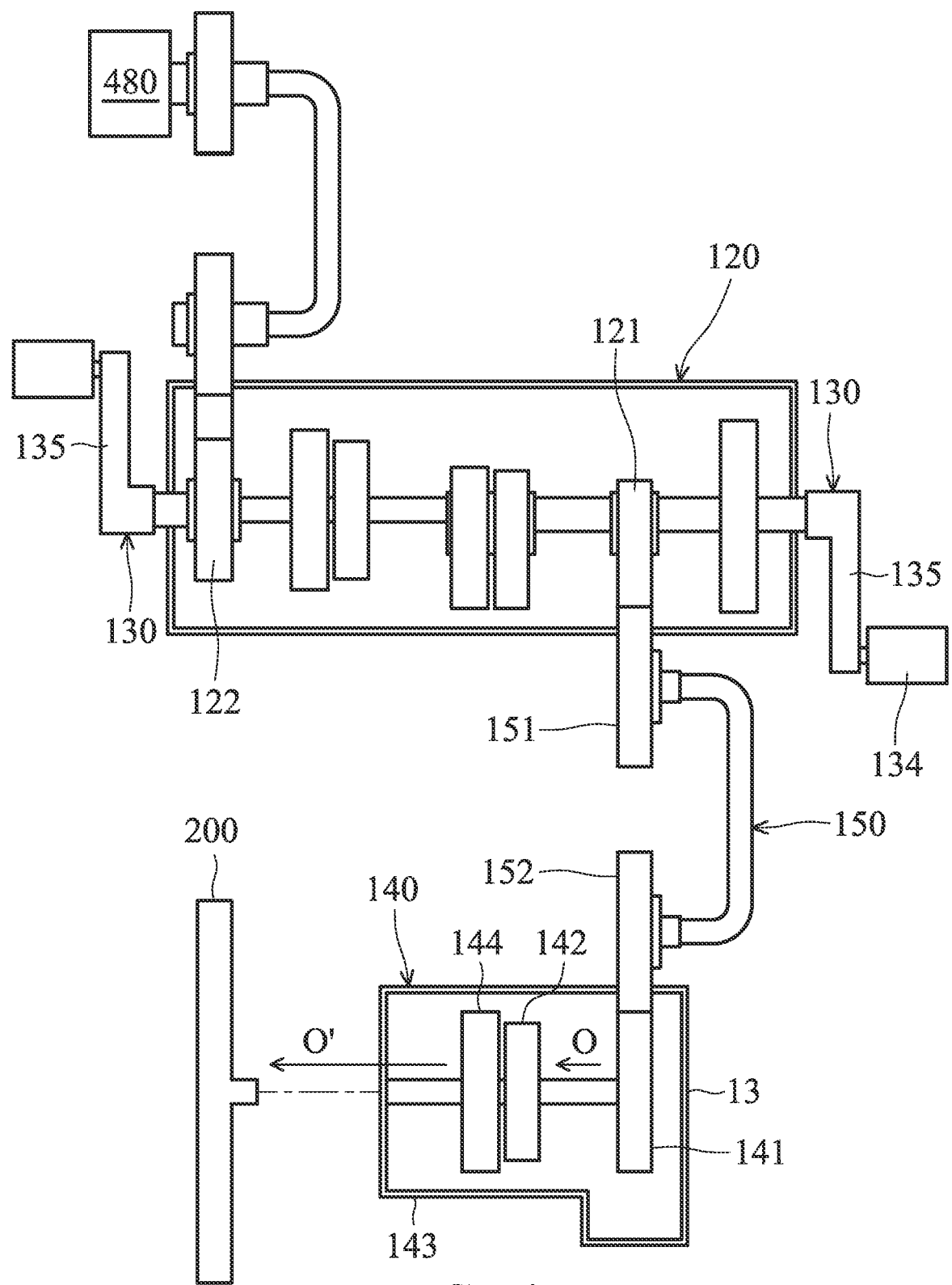
FIG. 4B is a schematic view of another embodiment of the transmission system of the green bike, wherein the gears of the transmission system are without teeth.

Please refer to FIG. 4A, wherein the tube shield 16 (or 16') and the bottom bracket shell 14 are not shown for simplification, instead, only the elements of the crank set 130, the first internal-gear module 120, the second internal-gear module 140, the transmission element 150, the driving wheel 200, and the first load device 480 are presented. The rotatable crank set 130, disposed on the two side walls 145 of the bottom bracket shell 14, has two pedals 134 and two shafts 135, wherein the shafts 135 are connected or coupled to the first internal-gear module 120. The first internal-gear module 120 is disposed in the internal space of the bottom bracket shell 14 and the second internal-gear module 140 is disposed in the space inside of the hub shell 143. The first and second internal-gear modules 120 and 140 are both internal gear shifting modules, which may by commercially available products such as a simple planetary or epicycle gear sets. The gear sets can provide 3-speed, more speed, or infinite gear ratios, wherein the first and second internal-gear modules 120 and 140 comprise at least one planetary, i.e. epicycle, gear element with or without teeth. The first and second internal-gear modules 120 and 140 are further coupled to the single gear-ratio control module 460 to change the gear ratio with a single action for creating an easier gear control and better riding experience. The first internal-gear module 120 may comprise an output gear 121 and an input gear 122. The second internal-gear module 140 may comprise an input gear 141, an output gear 144 and one or more planetary gears 142 with or without teeth, wherein the input gears 122 and 141, and output gears 121 and 144 can be a bevel gear or a sprocket gear with or without teeth as shown in FIGS. 3, 4A and 4B. The hub shell 143 can further comprise a bracket cover or dust cover means 13 to form a substantially sealed space for the second internal-gear module 140.

Please refer to FIG. 3. The major portion of the first transmission element 150, a transmission power coupling unit, is disposed in the tube shield 16 (or 16'). In this embodiment, the first transmission element 150 includes a first transmission member 151, a second transmission member 152, a shaft 153, and two bearings 154. The shaft 153, having two ends 158, is made of a high-tension metal containing material or can be formed by a flexible element comprising fiber glass or carbon containing materials, wherein the carbon containing material is a carbon-fiber material. Two ends 158 of the shaft 153 are respectively extended into the corresponding ends 162 and 163 of the tube shield 16 (or 16'), and two transmission members 151 and 152 are fixed to the two ends 158 of the shaft 153. The first transmission member 151, a bevel gear is disposed near the bottom bracket shell 14 and meshed with the output gear 121 of the first internal-gear module 120 in an intersecting way. The second transmission member 152, a bevel gear, is disposed near the hub shell 143 and meshed with the input gear 141 of the second internal-gear module 140 in an intersecting way. The bearings 154 are disposed on the inner side 161 of the tube shield 16 (or 16') so as to support and constrain the movement of shaft 153. Each of the bearings 154 includes a plurality of balls circumferentially disposed thereof. However, in the varied embodiment, the bearings 154 can be designed without balls by using low-friction or rigid materials.

It is noted that while the first transmission element 150 in this exemplary embodiment transmits the mechanical power from the first internal-gear module 120 to the second internal-gear module 140 via the shaft 153, it is not limited thereto. The first transmission element 150 can be comprised of at least one of a chain, a belt, a shaft, a flexible rod or a flexible cord. Additionally, the two transmission members 151 and 152 can be a gear, a bevel gear or a sprocket, and the two transmission members 151 and 152 can be substantially a round shape plate, a tooth-less round (i.e. ball or disc) shape unit, or a wheel-shape gear with teeth or without tooth.

Figure 15:
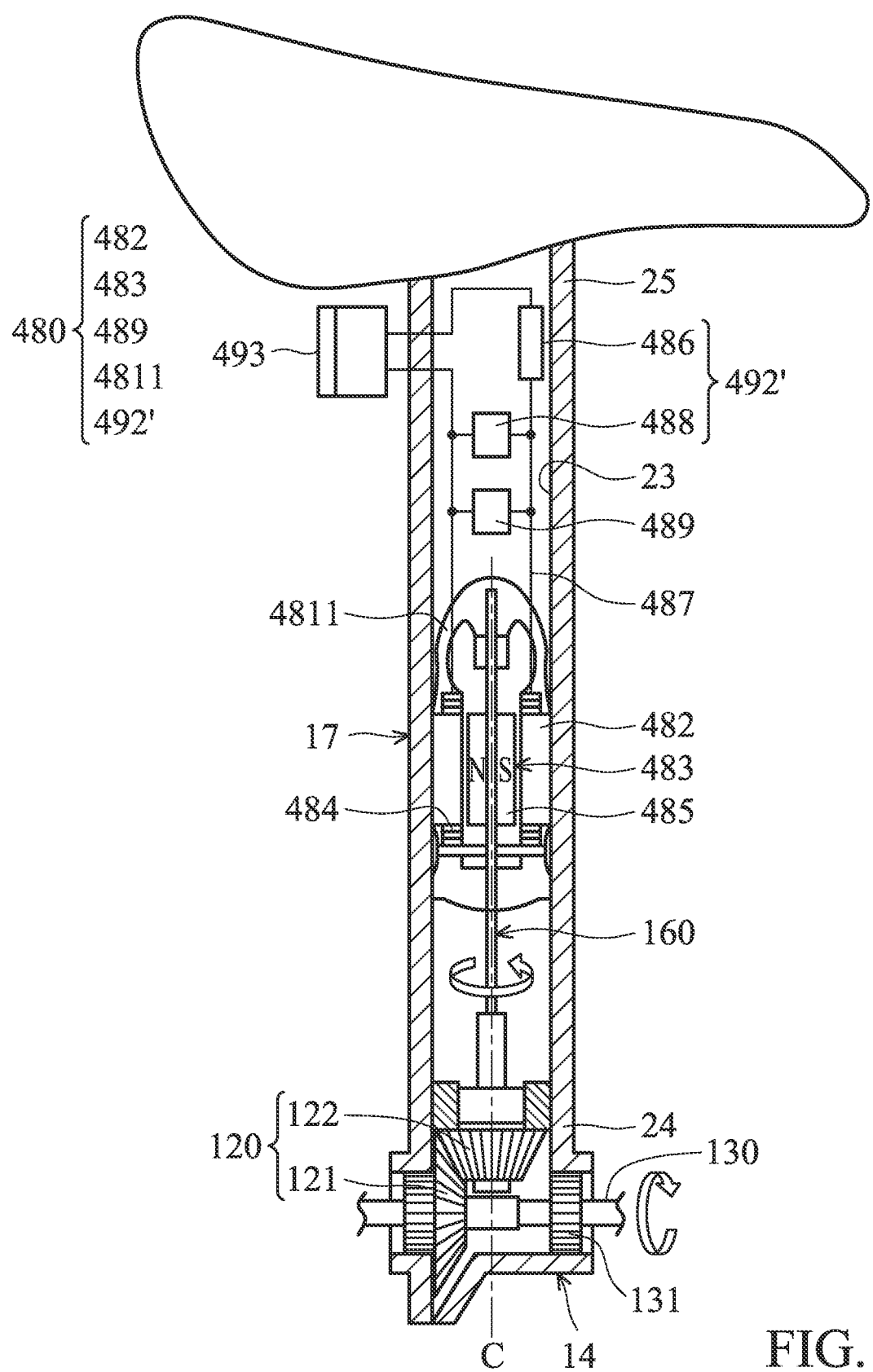
FIG. 15 is a partial schematic view of the green bike in FIG. 1 showing a first load device characterized with both power generator and drive motor functions.

Please refer to FIG. 15, the second transmission element 160, a rigid or flexible driving shaft is disposed in the seat unit 17 wherein the seat unit 17 is further comprising a saddle or a seat pad, substantially aligned with a central line C of the seat unit 17, and the second transmission element 160 is extended to the bottom bracket shell 14 and link the input gear 122 with the first load device 480. The second transmission element 160 is made of a high-tension metal containing material or can be formed by a flexible element comprising fiber glass or carbon containing materials wherein the carbon containing material is a carbon-fiber material. In this exemplary embodiment, the second transmission element 160 is a shaft, but it should not to be limited thereto, the second transmission element 160 can be a chain, a belt, a flexible rod or a flexible cord.

Please refer to FIGS. 1 and 4A. The single gear-ration control module 460 is a single lever or a single twist-grip shifter/switch. It is disposed on the handle bar 15 or other places of the frame 10 and coupled to the first and second internal-gear modules 120 and 140. The first load device 480, an electric power generator or a drive motor with power generating function, is the built-in or external device characterized with electric power generating function, wherein the detail structure of the first load device 480 is to be described in later paragraph.

The operational methods will be illustrated by given the following. A user, i.e. a rider, manually applies force to the crank set 130. Due to the rotation of the shaft 135 of the crank set 130, the first internal-gear module 120 operates, and through the engagement of a plurality of sprockets, gears or planetary gears disposed therein, the force or driving power I is converted to a gear ratio reduction or a directly drive or an overdrive geared output power, depending on whether and how the user operates the single gear-ration control module 460. Next, as shown in FIG. 3, the output power 'I' from the first internal-gear module 120 is transmitted to the shaft 153 of the first transmission element 150 due to the engagement of the output gear 121 of the first internal-gear module 120 and the transmission member 151 of the shaft 153. Then, the transmitted power is transmitted to the second internal-gear module 140 by the engagement of the transmission member 152 of the shaft 153 and the input gear 141 of the second internal-gear module 140. Similarly, as shown in FIG. 3, the power O may be converted by the second internal-gear module 140 to three or more different gear-ratio output powers O', if the single gear-ration control module 460 is activated, which will actuate the green bike 1 to move along the road smoothly. Manually or automatically depending on the roadway conditions, a user can further optionally start the first load device 480, wherein an output power I' coming from the first load device 480 is transmitted to the shaft 153 via second transmission element 160.

It is noted that, please refer to FIG. 4B, the input and output gears 121 and 122, the input gear 141, and the transmission members 151 and 152 can be a gear, a disc, a ball or a sprocket with or without having teeth. On the other exemplary example, as shown in FIG. 5, the two transmission members 151 and 152 are meshed with the input gear 141 or output gear 121 in a non-intersecting way, and the shaft 153 are divided into three sections in order to adjust a curved configuration of a tube shield 16', wherein each section of the shaft 153 are connected with a joint 155.

Figure 6:
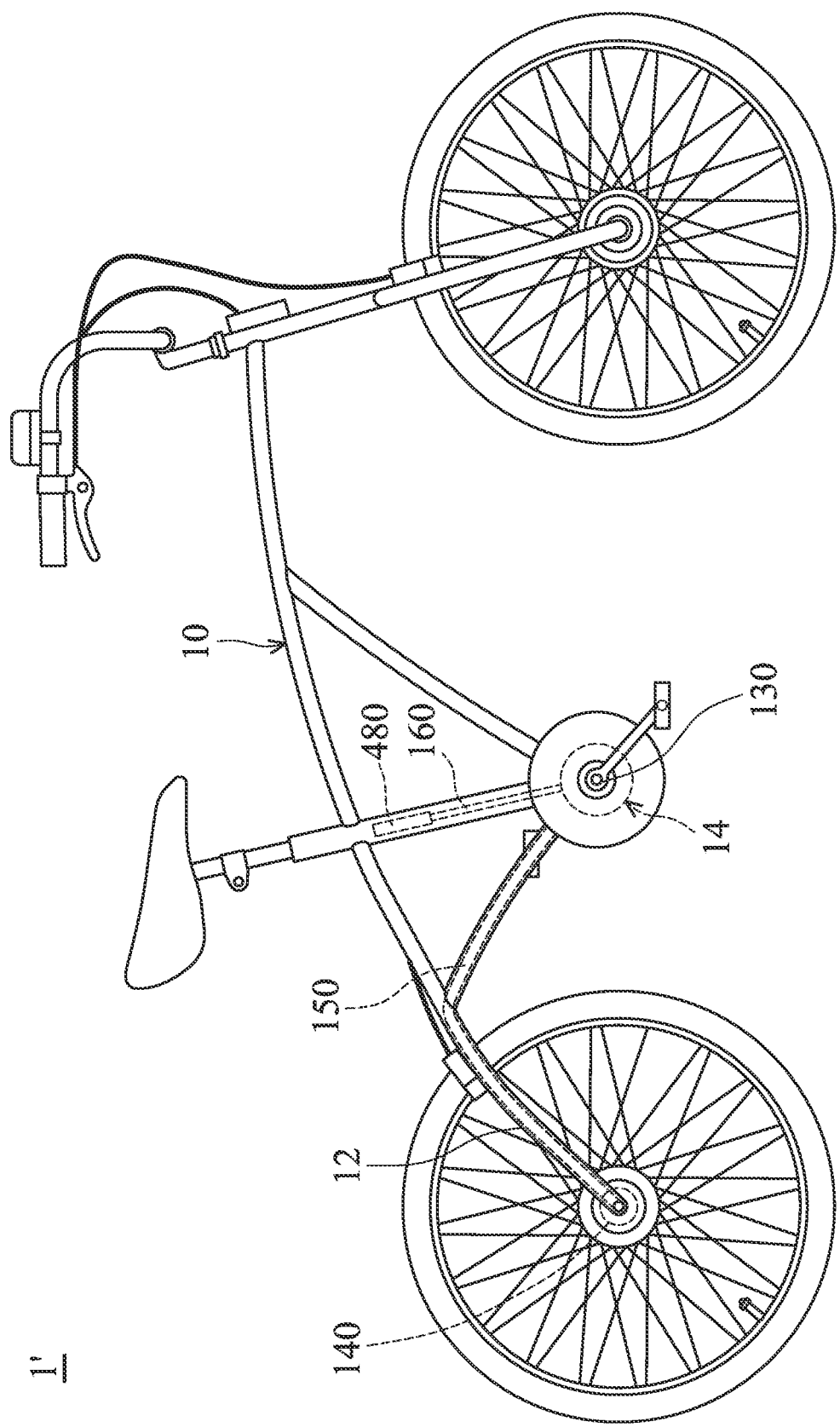
FIG. 6 is a schematic view of another varied embodiment of the green bike, wherein a major portion of the transmission element is disposed in a tube shield and the tube shield is part of the frame.

Please refer to FIG. 6. FIG. 6 illustrates another varied embodiment of the green bike V. In this embodiment, descriptions for the components and corresponding relationships thereof, which are quite similar to the green bike 1, are omitted. The tube shield 16 (shown in FIG. 1) linking with the frame 10 is eliminated, and the majority portion of the first transmission element 150 is disposed in the rear supporting unit 12 of the frame 10.

Please refer to FIGS. 1 and 4A. The advantage of the novel power transmission system 100 of the green bike 1 and 1' of the present invention is that the crank set 130 is not directly connected to the first transmission element 150. Instead, the force or power I or I', applied by a user or the first load device 480 respectively, is transmitted firstly to the first internal-gear module 120 and then transmitted to the second internal-gear module 140, where the force or power is allowed being changed up to nine or more different gear ratios because of that the three or more different speeds are provided by the first internal-gear module 120 and three or more different speeds are provided by the second internal-gear module 140 respectively. Also, unlike the conventional transmission system, the major portions of transmission elements 150, the first internal-gear module 120, and the second internal-gear module 140 are sealed within the tube shell 16 (or 16'), the bottom bracket shell 14, the hub shell 143 or the frame 10. Thus, it prevents parts being exposed to the ambient thereof, increasing utility and decreasing great amount of maintenance efforts of the green bike 1 or V. Furthermore, the requirement, transmitting the torque of the rider through transmission members with smaller radii than typical bicycle sprockets, can be made by high-tension metal compound, fiber glass or carbon fiber containing materials as to making it possible for achieving both low cost and light weight at the same time.

Figure 7:
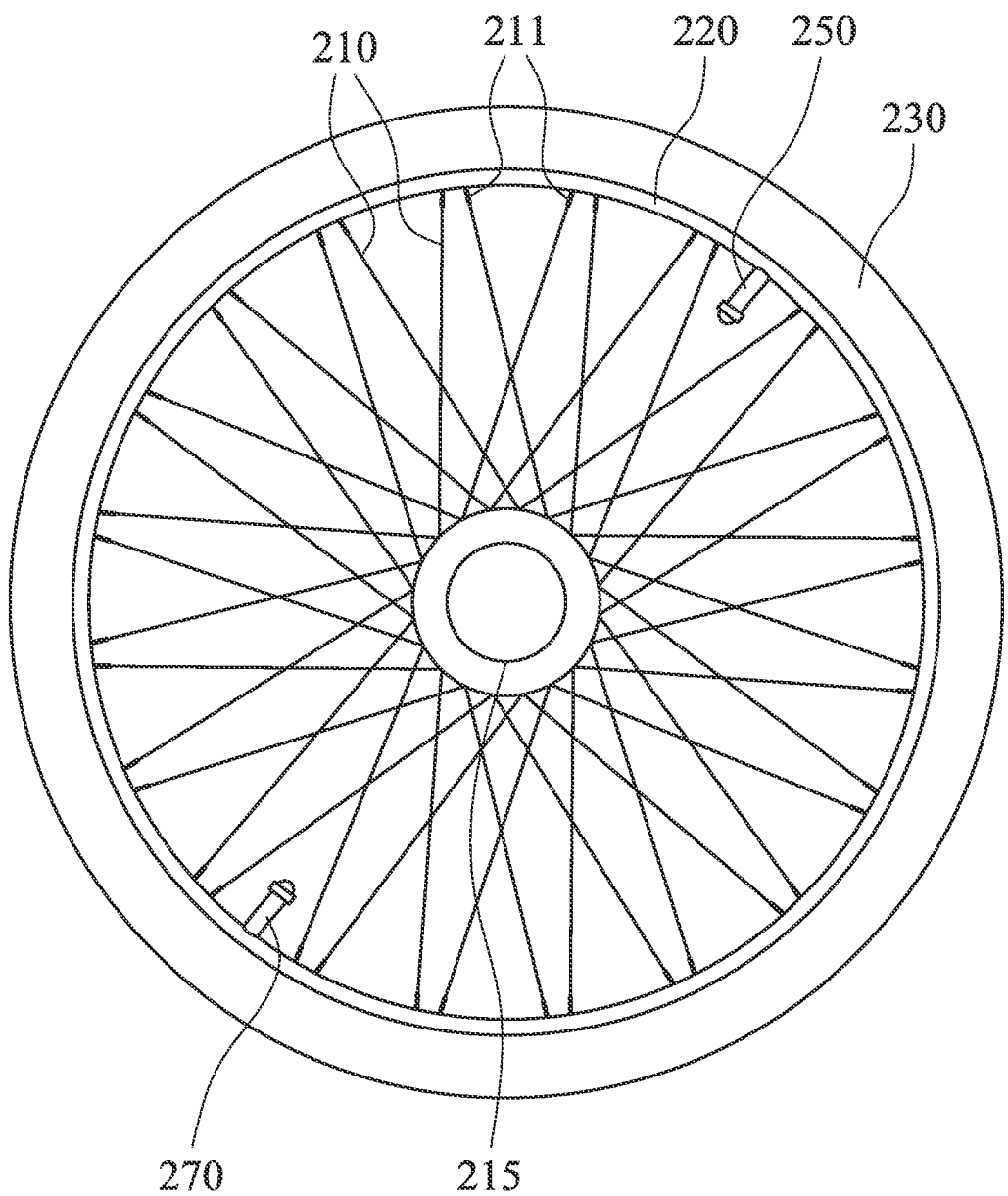
FIG. 7 is a schematic view of an embodiment of a wheel of the green bike in FIG. 1.
Figure 8A:
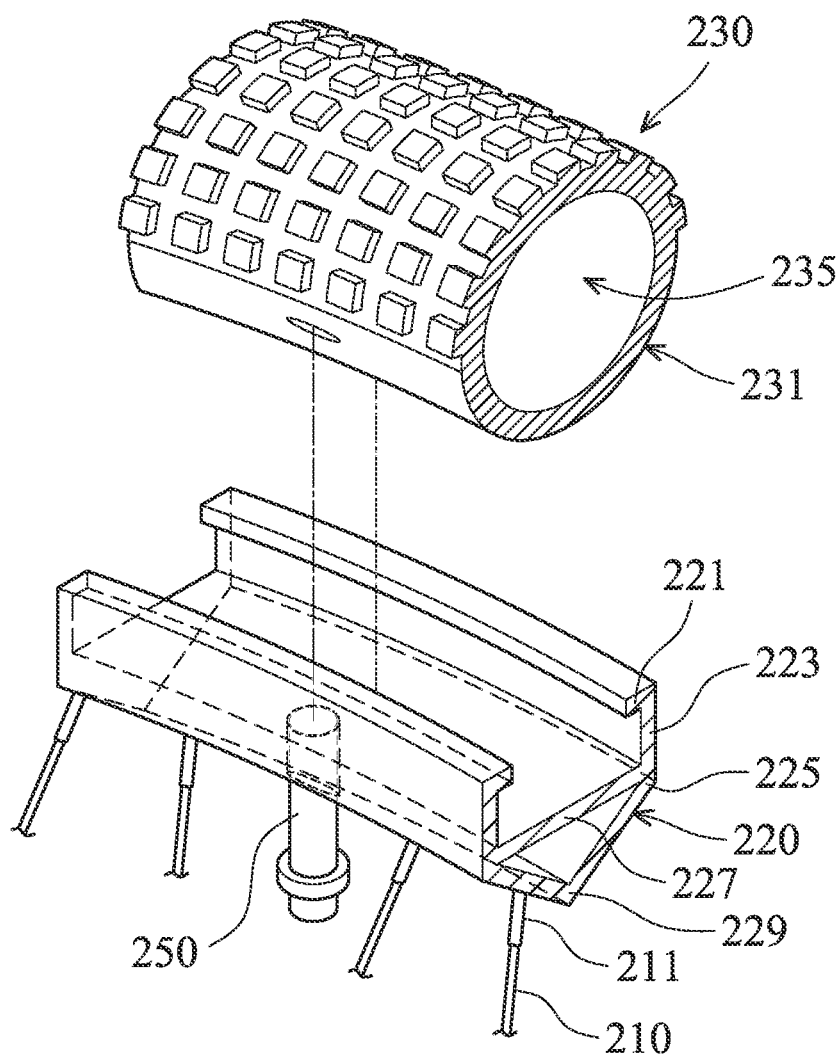
FIG. 8A is a partially exploded view of the wheel in FIG. 7.
Figure 8B:
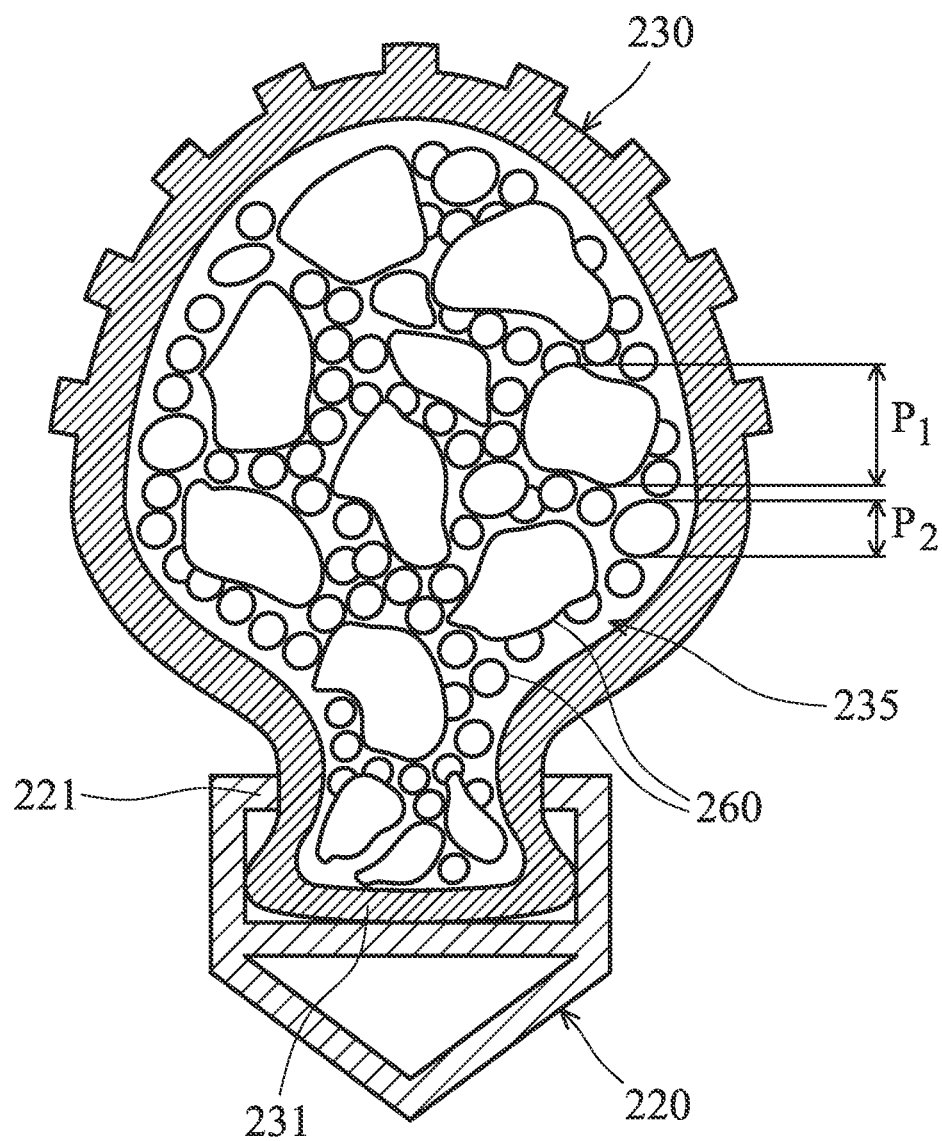
FIG. 8B is a cross-sectional view of the assembled wheel in FIG. 8A, wherein the tire is inflated by porous fillers with different dimensions, size or shapes (260)

Referring to FIGS. 7, 8A, 8B, the wheel 200 of a green bike 1 includes a hub 215, a plurality of spokes 210, a rim 220, a tire 230, an injection valve 250, an over-fill pressure relief valve 270, and a plurality of porous fillers 260 or gaseous material.

The hub 215 is a cylinder, wherein one end of the each spoke 210 is fixed to the hub 215. The spokes 210 radiate from the hub 215 and terminate in other ends 211. The rim 220 has a base portion 229, which holds the ends 211 of the spokes 210. The base portion 229 extends to a point 225. A mounting surface 227 of the rim 220 has a generally concave profile and extends between, and connects to, opposing points 225. Sidewalls 223 extend outwards from the points 225 and terminate in a bead lock region 221. The tire 230 is a single and substantially sealed tube unit, has a bottom region 231, which is held by the bead lock region 221. The injection valve 250 is disposed on bottom region 231 and extended into a space 235 surrounded by the tire 230. The gaseous material or the porous fillers 260, as one of the embodiments, a blowing agent which is a substance capable of producing a porous structure that undergoes a hardening or phase transition process once in contact with air or ambient, are filled into the space 235 of the tire 230 through the injection valve 250. In one embodiment, as shown in FIG. 8B, the plurality of porous fillers 260 have a first dimensions P1 and a second dimensions P2, wherein the first dimensions P1 are larger than the second dimensions P2. Upon inflation, the bottom region 231 gradually rides up until it tightly engages the sidewall 223. Due to the construction of the bottom region 231, the bead lock region 221 helps to stabilize the tightened engagement of the tire 230 with the rim 220. The over-fill pressure relief valve 270 is connected to tire 230 to release over-filled air, gaseous material or fillers if the pressure inside the space 235 is overloaded after the air, gaseous material or the porous fillers 260 are filled into the space 235.

Figure 9:
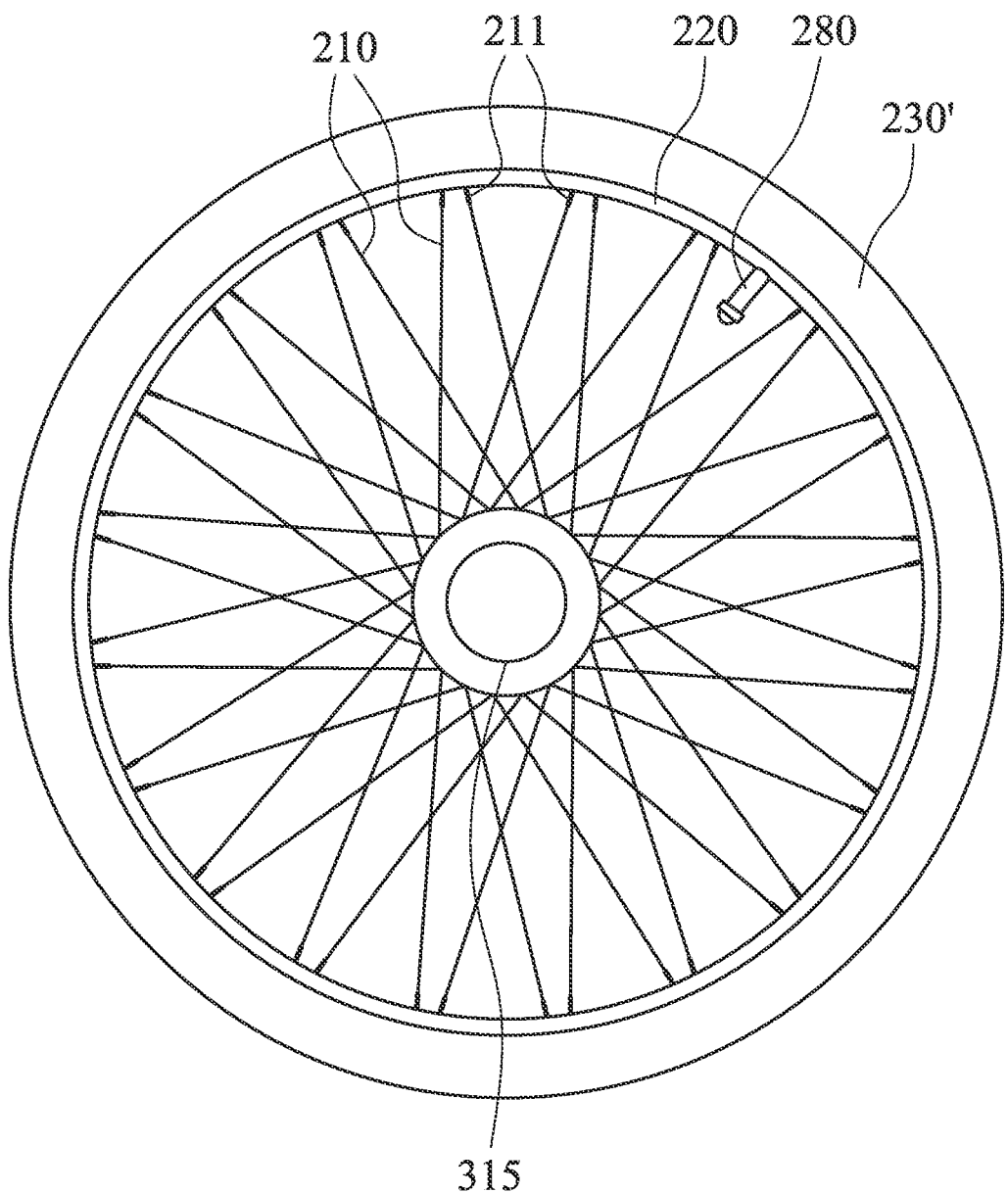
FIG. 9 is a schematic view of another varied embodiment of the wheel of the green bike.
Figure 10A:
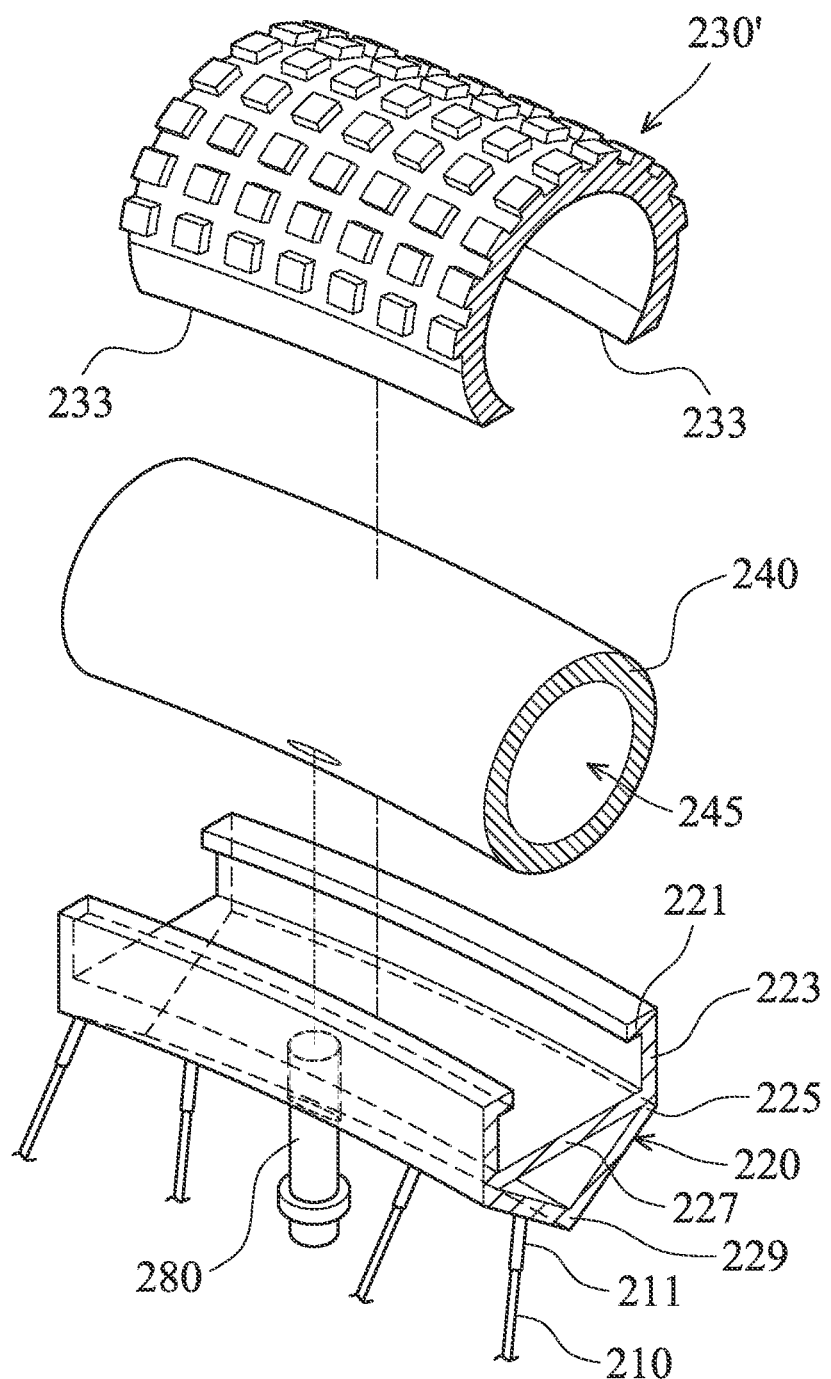
FIG. 10A is a partially exploded view of the wheel in FIG. 9.
Figure 10B:
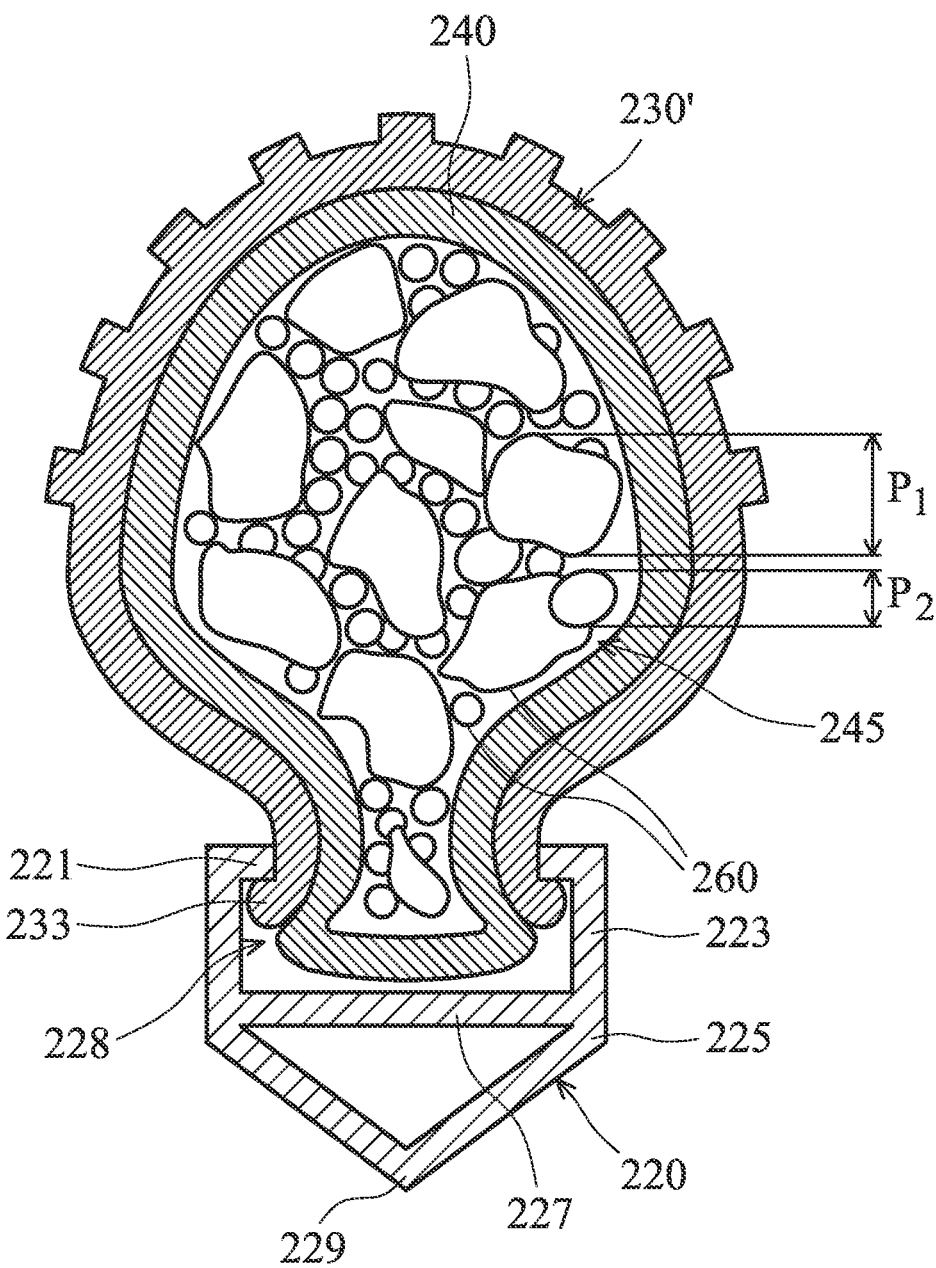
FIG. 10B is a cross-sectional view of the assembled wheel in FIG. 10A, wherein the wheel is inflated by porous fillers with different dimensions, size or shapes (260)
Figure 10C:
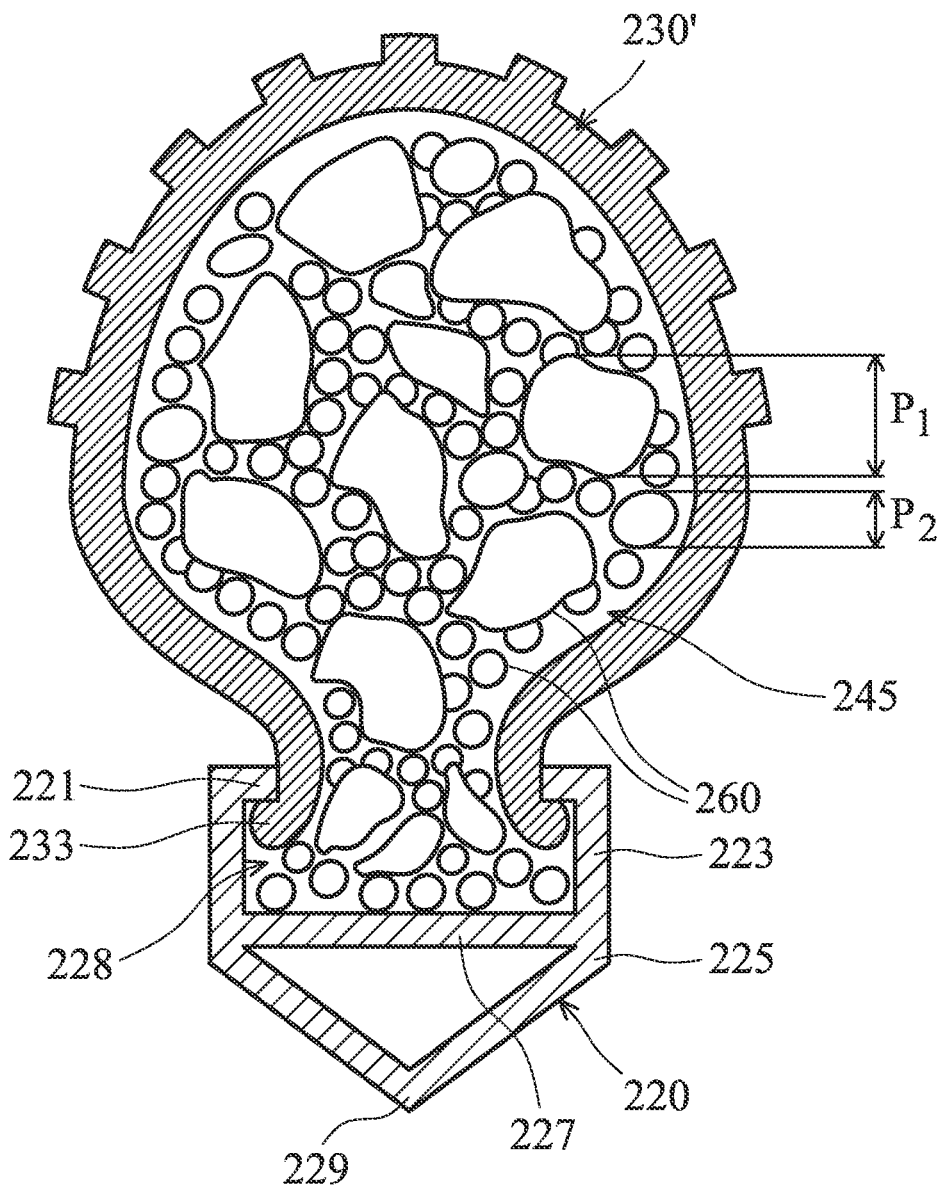
FIG. 10C is a cross-sectional view of another embodiment for the assembled wheel in FIG. 9, wherein the tire of the wheel is inflated by porous fillers with different dimensions, size or shapes (260)

Referring FIGS. 9, 10A, 10B and 10C. FIG. 9 is a schematic view of a wheel 200' of another exemplary embodiment of the invention. FIG. 10A is a partially exploded view of the wheel 200' in FIG. 9. FIG. 10B is a cross-sectional view of the wheel 200' in FIG. 9. FIG. 10C is a cross-sectional view of another embodiment for the assembled wheel 200 in FIG. 7. In this embodiment, descriptions for the components and corresponding relationships thereof, which are quite similar to the wheel 200, are omitted. The differences between the wheel 200' and the wheel 200 are that the wheel 200' further includes an inner tube or a covering layer 240, and the injection valve 250 and the over-fill pressure relief valve 270 are replaced by a multi-function valve 280. The tire 230' has a tire bead region 233, which is held by the bead lock region 221. Thus the sidewalls 223, the mounting surface 227 and the tire 230' form a space region 228. The covering layer 240, a sealed tube in a varied embodiment, is optionally disposed in the region 228 and forms a space 245. The multi-function valve 280 is disposed on the covering layer 240 and extended into the space 245. The gaseous material or a plurality of porous fillers 260 are filled into the space 245 of the covering layer 240 or the region 228 (as shown in FIG. 10C) through the multi-function valve 280. On the other hand, once the space 245 or the region 228 is fully stuck with the porous fillers 260, and if the filling pressure inside of the space 245 or the region 228 is overloaded, the over-pressured air, the gaseous material or plurality of fillers can be released by via the multi-function valve 280.

The wheel 200 in the present invention is filled with at least one of the plurality of porous fillers, which replaces the conventional gas-inflatable inner tube, and thereby, increases utility of the wheel and eliminates puncturing risk of the tire for achieving the safer and greener objectives of this invention.

Referring to FIG. 1 and referencing FIGS. 11A-15, the power generating module 400 includes a first power generation system 410, a control module 450 and a first regulator power module 492. A back-light LED 493 is disposed on the seat unit 17. It should be noted that, the first load device 480, may serve as a drive motor in the varied embodiment of the power transmission system 100. Meanwhile, the first load device 480 plays a role as a second power generation system and its functional method will be illustrated later.

Figure 11A:
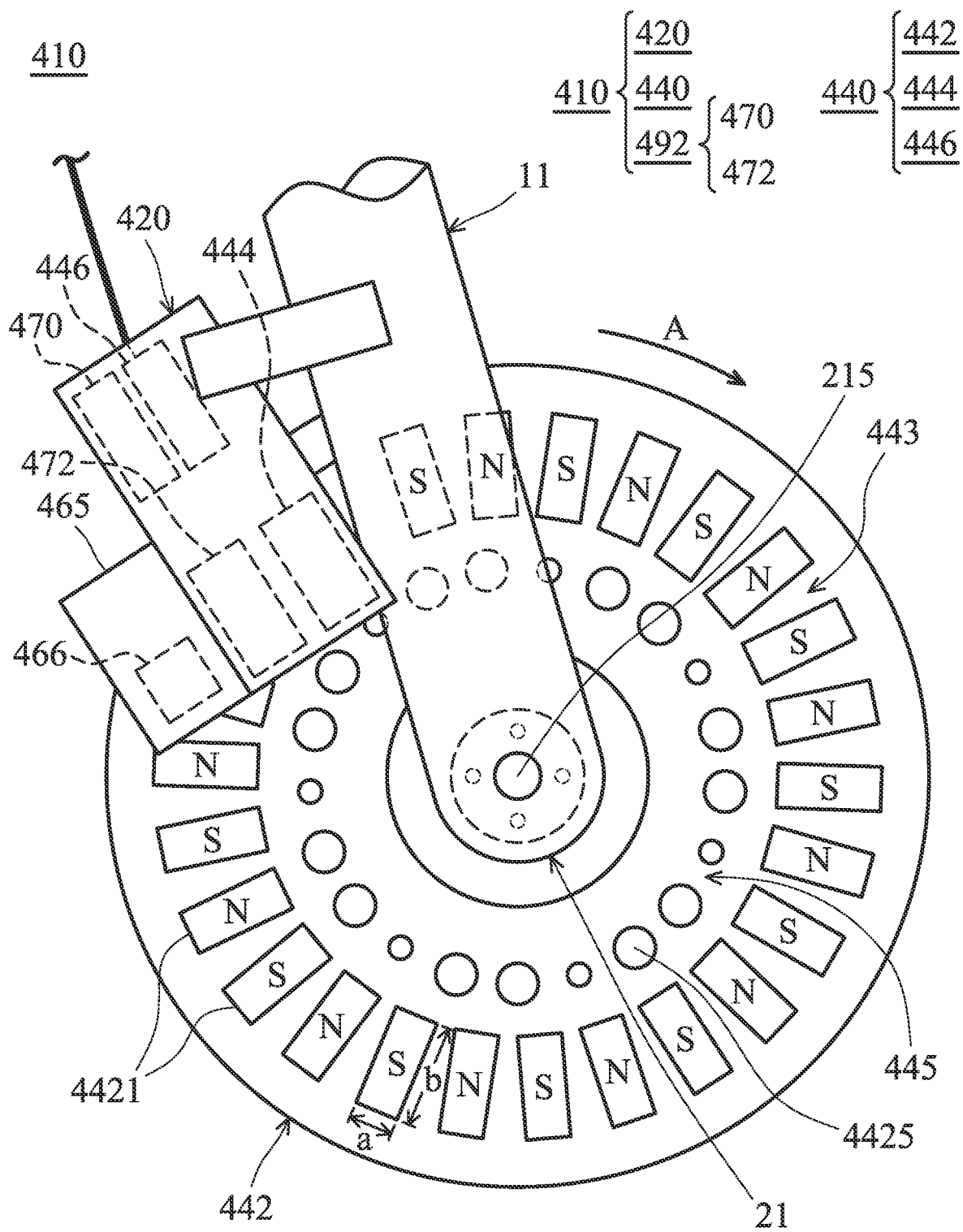
FIG. 11A is a partial schematic view of a first power generator (440) of the green bike in FIG. 1.
Figure 11B:
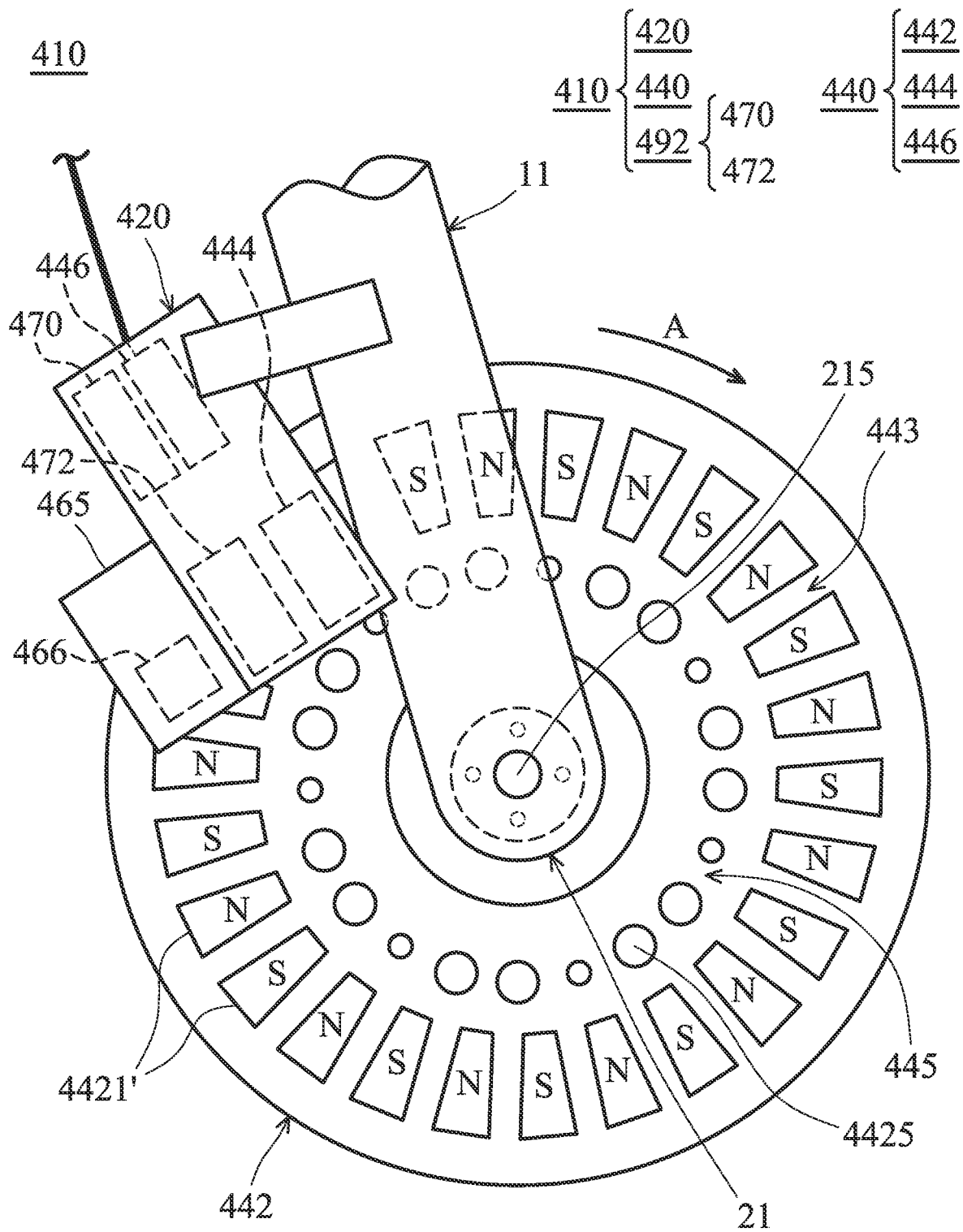
FIGS. 11B-11C are schematic views of the other varied embodiments of the first power generator (440) of the green bike.
Figure 11C:
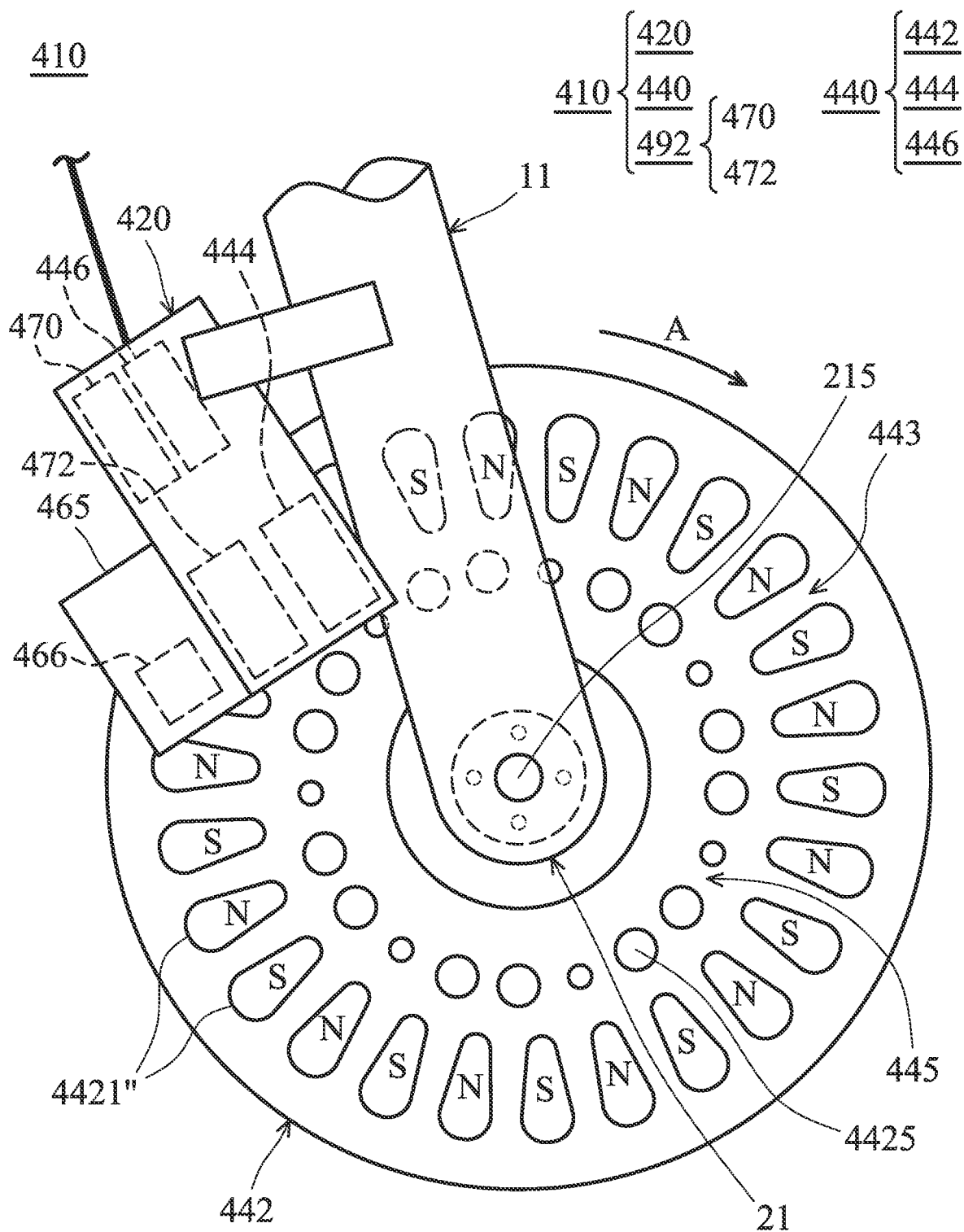
Figure 12A:
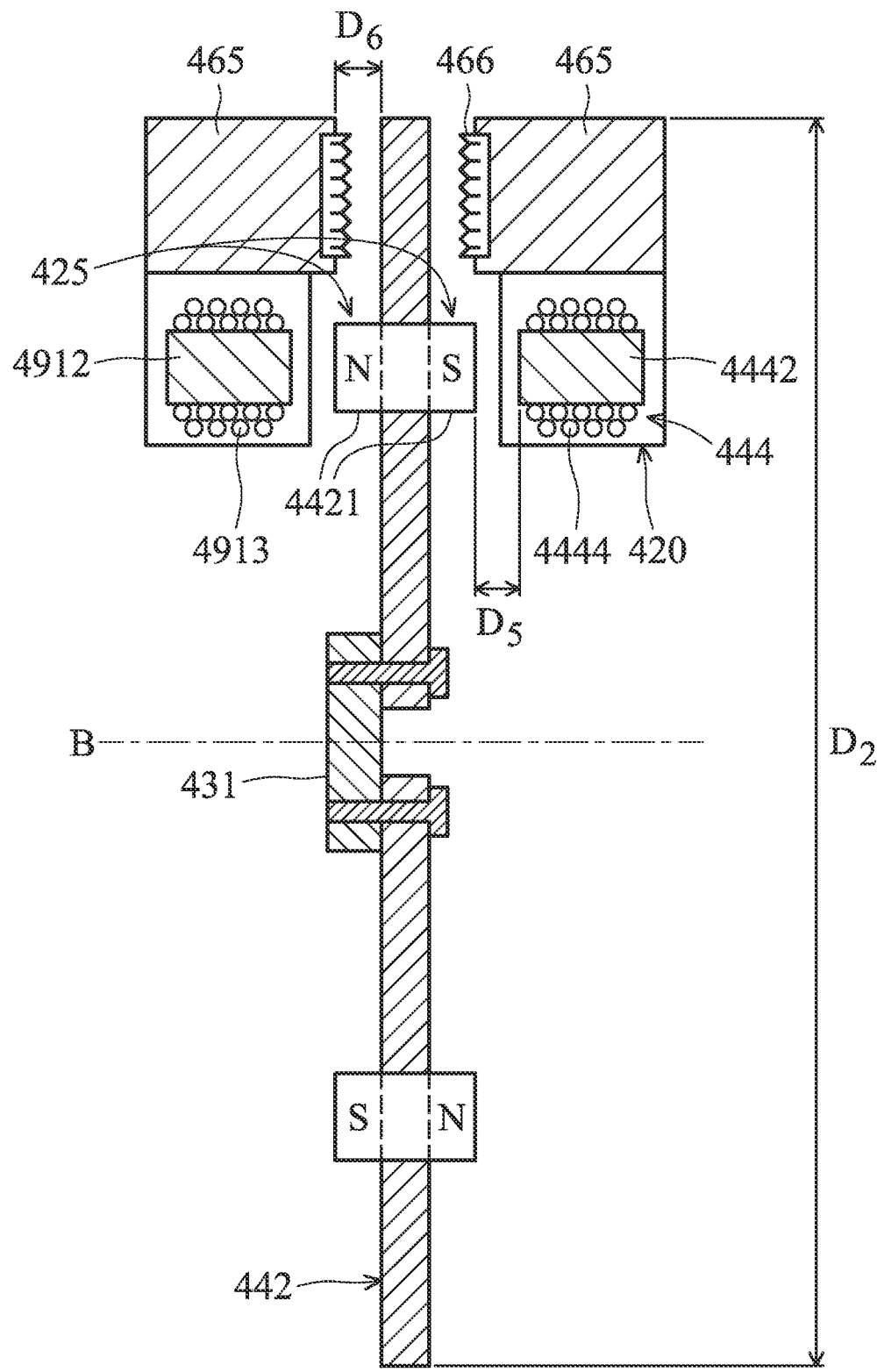
FIG. 12A is a side view of an embodiment of the first power generator (440) in FIG. 11A.
Figure 14:
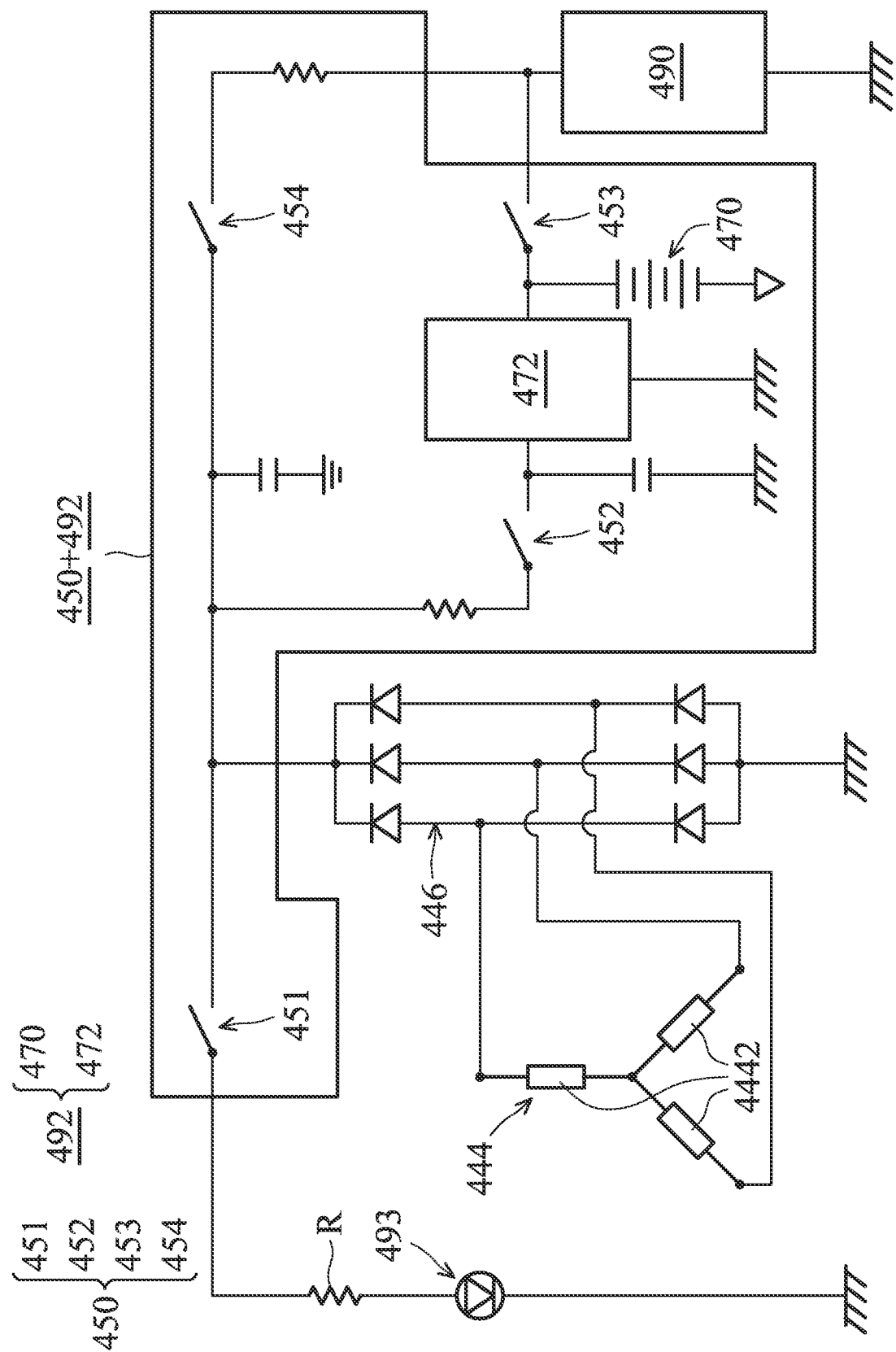
FIG. 14 illustrates a circuit diagram applied for a power generator of the green bike.
Figure 16:
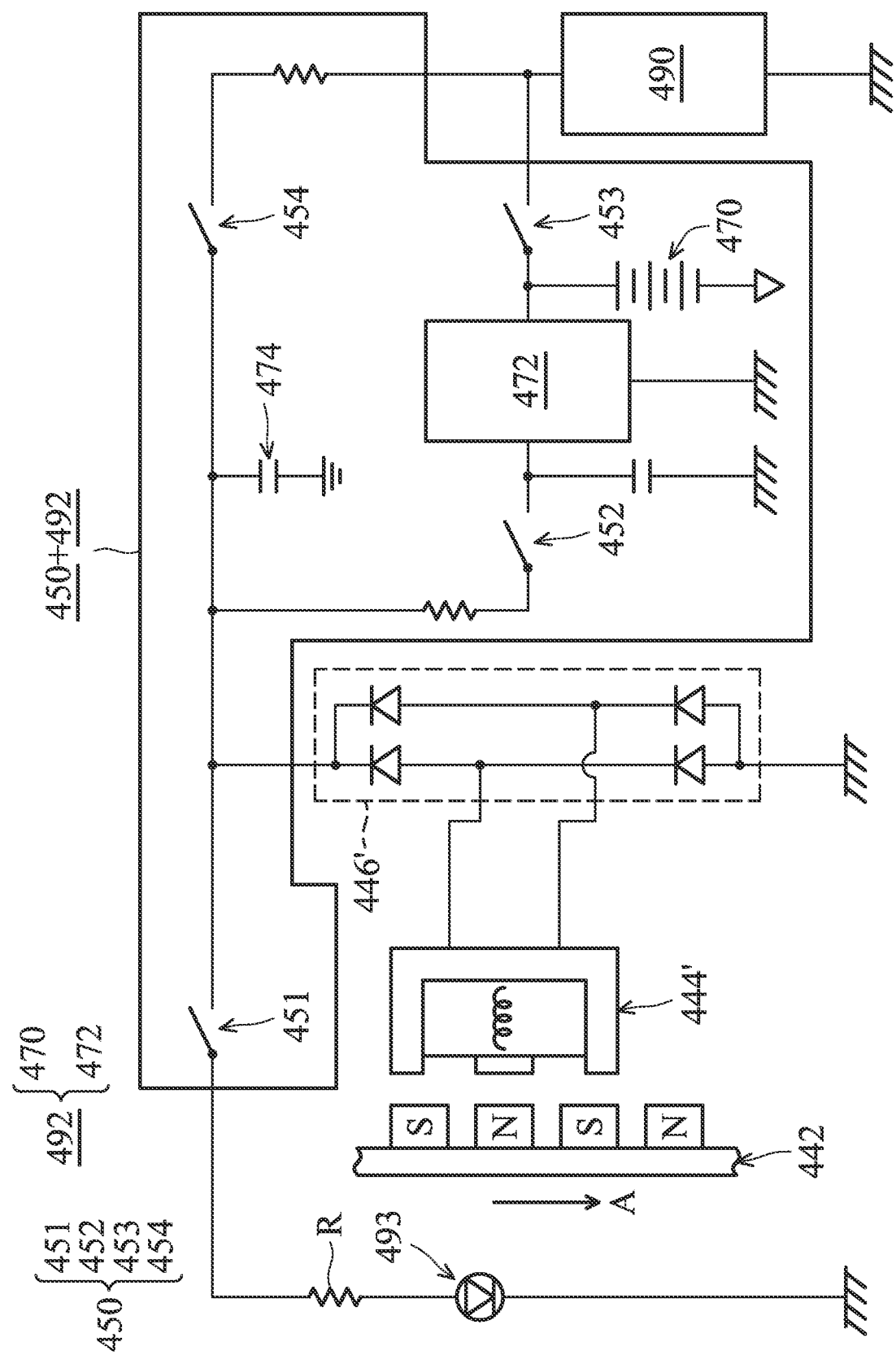
FIG. 16 illustrates a varied embodiment of a circuit diagram applied for the power generator of the green bike.

Referring to FIGS. 11A and 12A, the first power generation system 410 includes a shield cover 420, a first power generator 440 and a first regulator power module 492 (shown in FIG. 1, FIG. 14 and FIG. 16). It can be further associated with a disc-brake module 465 as shown in FIG. 11A-11C. The shield cover 420 is mounted on the front supporting unit 11 in one embodiment. The first power generator 440 includes a disc rotor 442, a first stator 444, and a first rectifier 446. The disc rotor 442, disposed on the hub 215, includes a ring area 443 and an inner ring area 445. The diameter D2 of the disc rotor 442 is larger than 10 cm such that the disc-brake module 465 can share the use of the disc rotor 442 with the first power generator 440 for saving both the total cost and form factor of the green bike 1. The ring area 443 is defined as a portion of the disc rotor 442 aligning with the shield cover 420. A plurality of magnetic poles 4421 is disposed, substantially by regularly spacing and about in parallel with the surface of the ring area 443 of the disc rotor 442, in the circumference region of the ring area 443 with alternating south poles S and north poles N. Thus, while the green bike 1 moves, the plurality of magnetic poles 4421 of the first power generator 440 is rotatable around the axis B of the wheel 200. A plurality of holes 4425 is disposed on the inner ring area 445 of the disc rotor 442 to dissipate heat due to friction of braking. In this exemplary embodiment, the shape of the magnetic poles 4421 is a rectangular shape, wherein a ratio of a length "b" and a width "a" of each of the plurality of magnetic poles 4421 is greater than about 2:1 for better power generating efficiency, but it should not be limited thereto. As shown in FIG. 11B, the magnetic poles 4421' are in about trapezoidal shapes. As shown in FIG. 11C, the magnetic poles 4421" are in about oval shapes. It is noted that outer portions of both of the magnetic poles 4421' and 4421" has a wider width or size than that of inner portions of the magnetic poles 4421' and 4421" which may contribute to the better power generating efficiency as well.

Figure 12B:
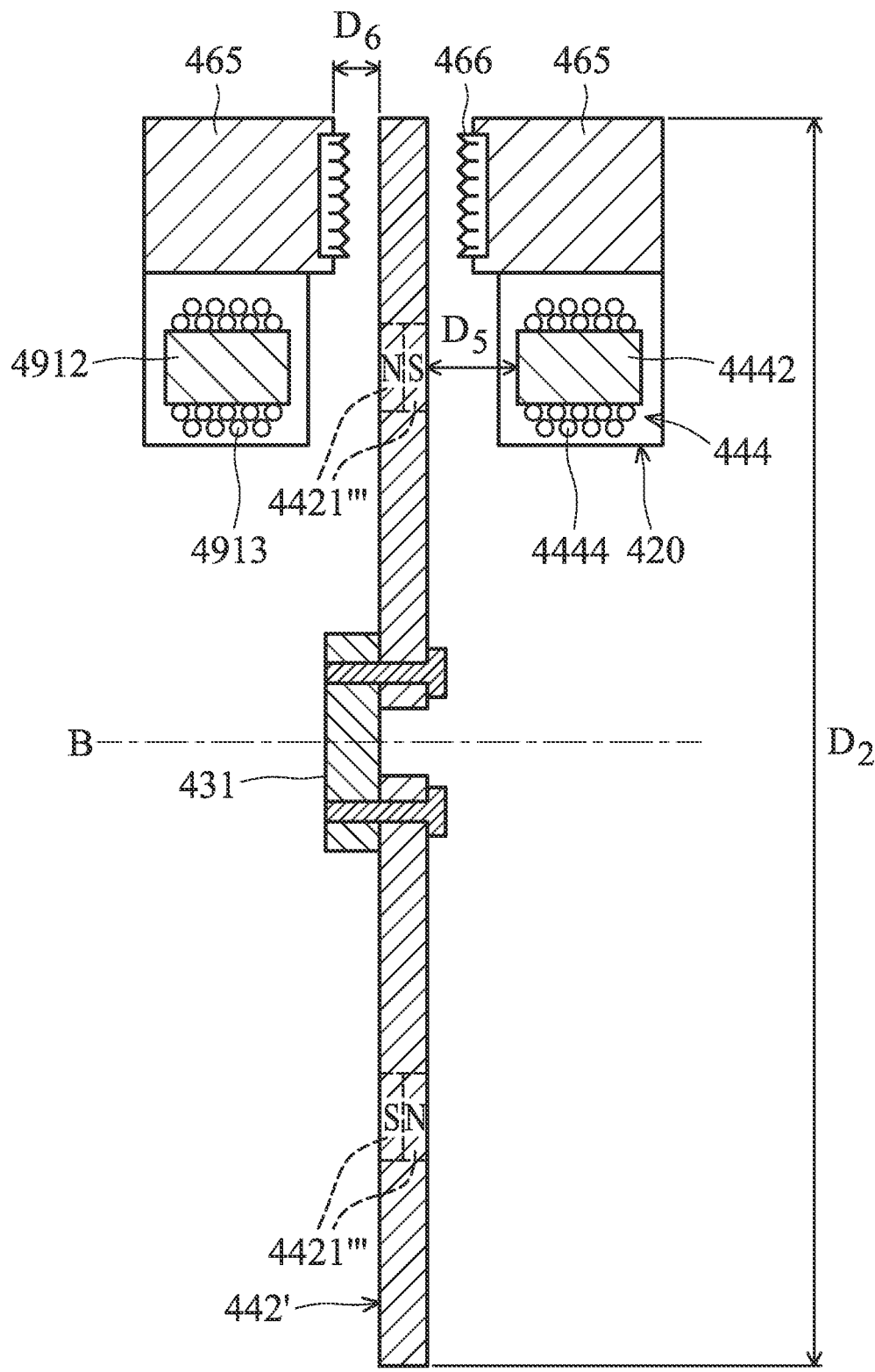
FIG. 12B is a side view of another varied embodiments of the power generator (440)

Please refer to FIG. 12B. In the other exemplary embodiment, the magnetic poles 4421''' are embedded in the disc rotor 442'. Specifically, the outer surfaces of the each of the magnetic poles 4421''' are about in parallel and aligned with the outer surface of the disc rotor 442'.

Figure 13B:
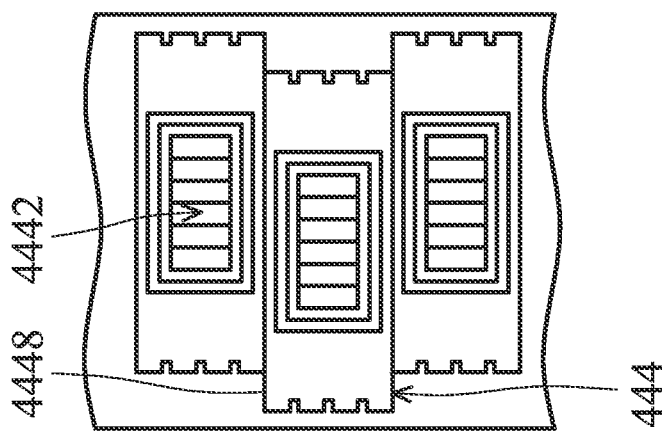
FIG. 13B is a side view of the plurality of pole fingers of the stator, wherein it showed an outer surface of the pole fingers in FIG. 13A.
Figure 13A:
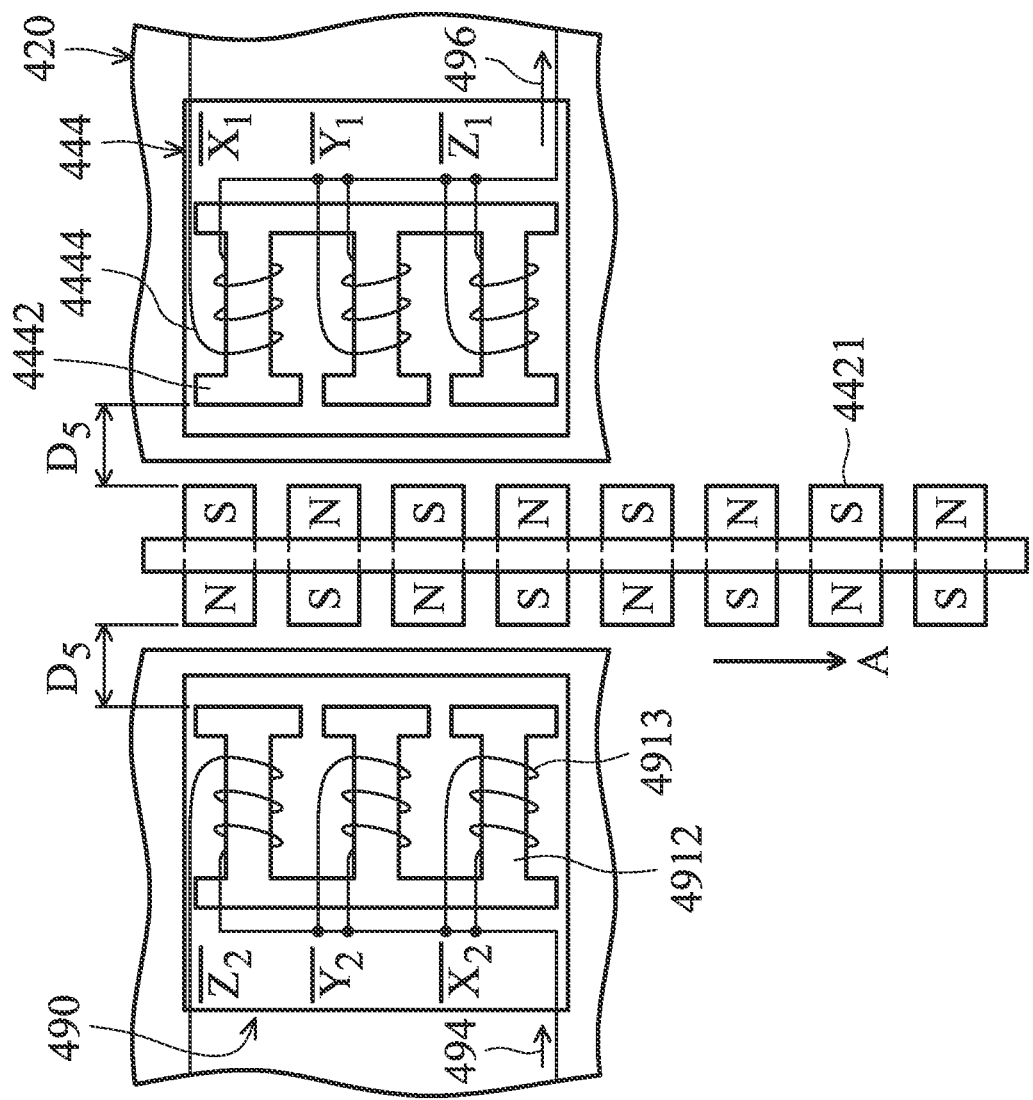
FIG. 13A is a schematic view of the first power generator of the green bike showing the positional relationship among a stator, a first plurality of pole fingers, a second plurality of pole fingers, a disc rotor and a plurality of magnetic poles.

Please refer to FIGS. 12A and 13A. The first stator 444 is aligned with the magnetic poles 4421 of the disc rotor 442, and the first stator 444 is disposed in the shield cover 420. The first stator 444 includes three first pole fingers 4442 and three coils 4444. The three first pole fingers 4442 are spaced parallel with the surface of the ring area 443. A working distance D5 between the outer surface of the magnetic poles 4421 and the surface of the corresponding outer surface of the first pole fingers 4442 is preferred less than about 2 to 3 mm for the purpose of achieving better power generating efficiency. The coils 4444 surround the three first pole fingers 4442 respectively and wherein the outer surface aspect ratio of a length and a width for the first pole fingers 4442 is greater than about 2:1 to match the outer surface of the plurality of magnetic poles 4421. Shown in FIG. 13A, the first stator 444 further comprises a second plurality of pole fingers 4912 (and coils 4913) being disposed on the opposite side of the plurality of first pole fingers 4421 across the disc rotor 442 surface for creating better electric power generation efficiency. Similar to the first stator 444, the three second pole finger 4912 corresponds to the magnetic poles 4421 of the disc rotor 442, and the outer surface of the three second pole finger 4912 is not square-shaped for higher and more stable electric power generating efficiency. It should be noted that, in this embodiment, as shown in FIG. 13B, the outer surfaces of the each of the three first pole fingers 4442 are preferred not in square-shaped for the purpose of higher and more stable electric power generating efficiency. As shown in FIG. 14, the first rectifier 446, which is a three-phased full-wave rectifier, which is electrically connected to the three coils 4444 of the first stator 444, to convert alternating current (AC), which periodically reverses current or voltage direction, to direct current (DC).

Please refer to FIG. 12A. The disc-brake module 465 can be mounted in another shield cover or in the same shield cover 420. It includes hydraulic-pot assisted brake pads 466 at the opposite sides of the surface of the disc rotor 442. A user can optionally select the rubber pads or rigid pads for the brake pads 466 to inhibit or slow down the motion of the green bike 1 whenever needed.

Referring to FIG. 14, the first regulator power module 492 is comprised of a voltage regulator 472 and an first energy storage device 470, where in the first energy storage device 470 can be mounted in a portion of the frame 10 or can be embedded in the shield cover 420 so as to making a compact form factor design. The voltage regulator 472 is electrically connected or coupled to the first rectifier 446, and the first energy storage device 470 is electrically connected or coupled to the voltage regulator 472. The first energy storage device 470 can be a rechargeable battery, rechargeable fuel cell, and capacitor or the like, and it is mounted in the shield cover 420 as exemplary case shown in FIG. 11A. There is a second load device 490, in this embodiment, and is electrically coupled to the first energy storage device 470 with wired or wireless connection, wherein the second load device 490 is a head light, a rear light, a flash light, a radio or the combination thereof. Or, in a varied embodiment, the second load device 490 is characterized by GPS, PDA, cellular phone or mobile electronics with phone function or the combination thereof.

Referring to FIG. 15, the first load device 480 includes a second stator 482, a second rotor 483, a second rectifier 489, a support 4811, and a second regulator power module 492'. The second regulator power module 492' includes a second voltage regulator 486 and a second energy storage device 488, wherein the second energy storage device 488 is embedded in another shielding (or dust) cover or a portion of the frame. The support 4811 can be further comprising a bearing unit with or without balls. The support 4811 is disposed on the inner surface 23 of the seat unit 17, and the second stator 482, including at least one second coil 484, is disposed thereon. The second rotor 483, corresponding to the second stator 482, includes a plurality of magnetic poles 485 which is disposed on an outer cylindrical surface of the second transmission element 160 with alternating south and north poles. The magnetic poles 485 rotate around an axis C when the pedal 134 of the crank set 130 is applied with a force or mechanical power. The second rectifier 489 is coupled to the second coil 484 of the second stator 482 to convert alternating current (AC) or voltage, which periodically reverses current direction, into direct current (DC) or voltage. In one embodiment, with wired or wireless connection, the second energy storage device 488 is coupled to the second load device 490 (or 490') or the back-light LED 493 through the control module 450, wherein the second energy storage device 488 is a rechargeable battery, rechargeable fuel cell or a capacitor.

Please refer to FIGS. 1 and 14. The control module 450, disposed on the handle bar 15 of the frame 10 as shown in FIG. 1, includes a first switch 451, a second switch 452, a third switch 453 and fourth switch 454. The first switch 451 is coupled between the back-light LED 493 and the first power generator 440 (or the first load device 480 with power generating function). Respectively, the second switch 452 is coupled between the first (or second) rectifier 446 (or 489) and the first (or second) voltage regulator 472 (or 486). The third switch 453 is coupled to the first (or second) voltage regulator 472 (or 486), the first (or second) energy storage device 470 (or 488), and the second load device 490. The fourth switch 454 is coupled between the first power generator 440 and the second load device 490 (or 490'), or is coupled between the first load device 480 and the second load device 490 (or 490'). All of the switches 451-454, can be installed in a single set of the control module 450 together or disposed piece wisely (or separately) in various locations on the frame 10. The control module 450 can be linked together mechanically with the disc-brake module 465 or brake control module 18, or they can be coupled together with other automatic switching apparatus to facilitate the much better riding experiences.

Please refer to FIGS. 1, 11A and 15. When the green bike 1 moves or a rider applies force to the pedal 134, depending on the varied embodiments, the disc rotor 442 of the first power generator 440 can be rotating alone; or the second transmission element 160 can be rotating alone. Or, both disc rotor 442 and the second transmission element 160 can be rotating at the same time. Referring to FIGS. 14 and 16, if the second switch 452 is closed, the power produced by the first power generator 440 is coupled to a voltage regulator 472 and then a major portion of the power is stored in the first energy storage device 470. For a varied embodiment, the power produced by the first load device 480 is coupled and then stored in the second energy storage device 488. While the third switch 453 is closed, the second load device 490 is being supplied with the regulated electrical DC current or voltage, which is coupled with the AC current or voltage of 496 or 494 (see FIG. 13A), coming from the first energy storage device 470 or the voltage regulator 472. The first load device 480, in a varied embodiment, converts AC electrical current or voltage of 496 and 494 into mechanical energy, and speeds up the green bike 1 via the second transmission element 160. In this case, an assistant force is produced by the first load device 480 while the green bike 1 is moving more easily toward an up-hill roadway. On the other hand, while the green bike 1 is moving toward a down-hill roadway with the second switch 452 closed and the third switch 453 opened, the first load device 480 generates electric power or energy associated with recycling of the down-hill kinetic energy of the green bike 1. Then, the second energy storage device 488 gets recharged without the presence of city electricity power. The second load device 490, in another varied embodiment, may also directly utilize the electric power generated by the first power generator 440 or by the first load device 480, if the fourth switch 454 is closed and the third switch 453 is opened.

Please refer to FIGS. 1, 4A, and 15. The first load device 480, in a varied embodiment, also serve as the drive motor associated with the power transmission system 100. The power stored in the second energy storage device 488 can serve as a power or energy supply for the drive motor of the first load device 480. In this case, the rotor 483 is repelled by the magnetic force produced by the stator 482, and the magnetic force is transmitted to the first internal-gear module 120, via the second transmission element 160, to actuate the driving wheel 200 of the green bike 1 to move forward easily along the roadway.

Please refer to FIGS. 1, 12A, and 14. For still another embodiment, if the brake control module 18 and the first switch 451 are linked together, the back-light LED 493 is lit while the brake control module 18 is activated. In this case, the back-light LED 493 is lit on by the energy stored in the first energy storage device 470 or by the first power generator 440. Further, when the first switch 451 or the second switch 452 are closed, a magnetic friction force is produced by generating electric energy associated with recycling of the kinetic energy via the first power generator 440, which hinders the movement of the green bike 1 to achieve an objective and utility of this invention.

Figure 17A:
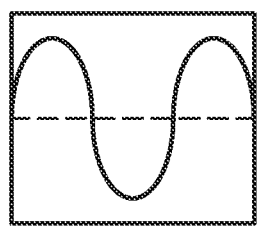
FIG. 17A shows an exemplary AC input voltage waveform generated by the coil of the power generator before an AC input voltage is transferred to DC output voltage in accordance with the circuit diagram of FIG. 14.
Figure 17B:
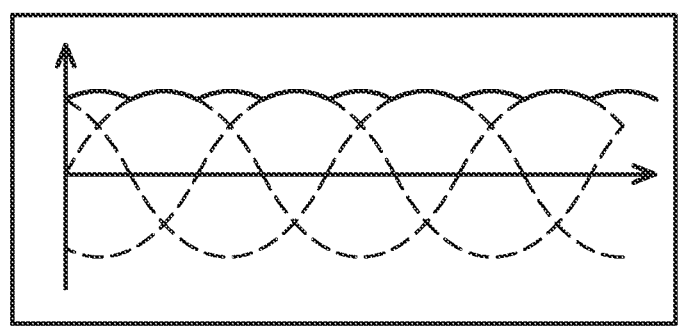
FIG. 17B shows an exemplary DC output voltage waveform after the three-phase AC voltage waveforms of the power generator is transferred to a substantial DC output voltage in accordance with the circuit diagram of FIG. 14.
Figure 17C:
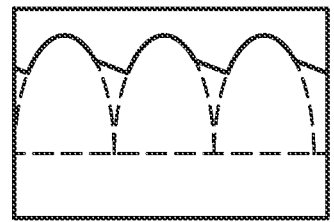
FIG. 17C shows a typical DC output voltage waveform after the single-phase AC input voltage is transferred to DC output voltage in accordance with the circuit diagram of FIG. 16.

The advantage of utilizing the three phase rectifier 446 is to stabilize the electric current or voltage produced by the first power generator 440. Referring FIG. 16, it shows a diagram in which a normal rectifier 446' and a stator 444' with one finger and one coil are applied. FIG. 17A shows the exemplary electric voltage waveforms before an AC input voltage is transferred to DC output voltage, in accordance with the circuit diagram of FIG. 14 or 16. Meanwhile, FIG. 17B shows voltage waveforms after the AC input voltage is transferred to DC output voltage, in accordance with the circuit diagram of FIG. 14. FIG. 17C shows waveforms after the AC input voltage is transferred to DC output voltage, in accordance with the circuit diagram of FIG. 16. As shown in FIG. 17B, the output electric voltage waveform, being converted by the three face rectifier 446, is more stable and less ripple than that of the normal rectifier 446' shown in FIG. 17C.

In a varied embodiment, the first energy storage device 470 can be disposed in the front supporting unit 11, as shown in FIG. 1, or in any portion of the frame 10. In other varied embodiments, the second load device 490 (or 490') is a head-light LED, which is disposed on the handle bar 15 or on the frame 10, as shown in FIG. 1, and it uses the power supplied by the first energy storage device 470 or the power generated by the first power generator 440 for roadway illumination, wherein the second load device 490 (or 490') is electrically coupled to the energy storage device with wired or wireless connection. In still another embodiment, the second load device 490 is electrically coupled, with wired or wireless connection, to the first energy storage device 470, such as a head light, a rear light, a flash light, a radio, a GPS, a PDA, a cellular phone, a mobile electronics or the combination thereof.

The power generating module 400 or the first load device 480 may overcome the disadvantage of a plugged-in recharging process of the conventional method associated with using the city electricity. By utilizing the first energy storage device 470 and the first power generator 440, electric energy can be directly or indirectly produced manually without generating green-house gases or carbon emission. Especially, while riding on downhill, wherein the kinetic energy of the green bike 1 is able to be converted to electric power and stored in the energy storage device 470 (or 488) for later use, for example, to actuate the first load device 480 (as a drive motor) while riding on the uphill.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A green bike comprising:
   a frame, having a front supporting unit, and a rear supporting unit;
   a driving wheel, attached to at least one of the front supporting unit or the rear supporting unit;
   a gear module, linked a pedal with the driving wheel for changing a gear ratio;
   a first transmission element, coupled to the pedal, the gear module and the driving wheel; and a second transmission element, coupling a transmission power of the pedal with a first load device other than the driving wheel;

wherein the gear module, the first transmission element, the second transmission element, and the first load device are disposed in the frame; wherein the first load device is a built-in device utilizing the second transmission element to generate electric power, and the second transmission element comprises a shaft coupled to the gear module and configured to rotate about a rotation axis, the first load device comprises a rotor disposed on the shaft and a stator corresponding to the rotor.

2. The green bike as claimed in claim 1, wherein the first load device is able to be coupled to a second load device, wherein the second load device is a head light, a rear light, a flash light, a radio or the combination thereof.

3. The green bike as claimed in claim 1, wherein the first load device is able to be coupled to a second load device, wherein the second load device is a mobile electronics characterized with GPS, PDA, or cellular phone functions.

4. The green bike as claimed in claim 1, further comprising an energy storage device electrically coupled to the first load device, wherein the energy storage device is a rechargeable battery, rechargeable fuel cell or a capacitor.

5. The green bike as claimed in claim 4, wherein the first load device is coupled to a second load device, and the energy storage device is able to be electrically coupled to the second load device with wired or wireless connection.

6. The green bike as claimed in claim 4, further comprising a shield cover disposed on the frame, wherein the energy storage device is embedded in the shielding cover or a portion of the frame.

7. The green bike as claimed in claim 1, wherein the second transmission element comprises glass or carbon fiber containing materials.

8. The green bike as claimed in claim 1, wherein the second transmission element is comprised of a chain, a belt or a shaft.

9. The green bike as claimed in claim 1, wherein the second transmission element is comprised of a flexible rod or a flexible cord.

10. The green bike as claimed in claim 1, further comprising a brake module, wherein the first load device generates electric power associated with recycling of a kinetic energy, while activating the brake module.

11. The green bike as claimed in claim 1, wherein the first load device is configured to transfer mechanical power from the gear module to electrical power for storage or configured to transfer electrical power to mechanical power to drive the gear module.

12. A green bike comprising:
a frame, having a front supporting unit, and a rear supporting unit;
a driving wheel, attached to at least one of the front supporting unit or the rear supporting unit;
a gear module, linked a pedal with the driving wheel for changing a gear ratio;
a first transmission element, coupled to the pedal, the gear module and the driving wheel;
a second transmission element, coupling a transmission power of the pedal with a first load device other than the driving wheel; and
a brake module, wherein the first load device generates electric power associated with recycling of a kinetic energy, while activating the brake module;
wherein when the first load device is in a first mode, the first load device serves as a power generator and utilizes the second transmission element to convert the transmission power from the pedal to electrical power, and when the first load device is in a second mode, the first load device serves as an electric motor to provide an output transmission power to the second transmission element to drive the green bike;
wherein the gear module, the first load device, the first transmission element, and the second transmission element are disposed in the frame.

13. The green bike as claimed in claim 12, wherein the first load device is able to be coupled to a second load device, wherein the second load device is a mobile electronics characterized with GPS, PDA, or cellular phone functions.

14. The green bike as claimed in claim 13, wherein the first load device is coupled to an energy storage device, and the energy storage device is able to be electrically coupled to the second load device with wired or wireless connection.

* * * * *